(12) United States Patent
Laird et al.

(10) Patent No.: US 11,954,730 B2
(45) Date of Patent: *Apr. 9, 2024

(54) MANAGING MERCHANT COMMUNICATIONS

(71) Applicant: LIVINGSOCIAL, INC., Washington, DC (US)

(72) Inventors: Eric Laird, Washington, DC (US);
Cara Maggioni, Washington, DC (US);
Kerry Lenahan, Washington, DC (US);
Timothy McCann, Washington, DC (US)

(73) Assignee: LIVINGSOCIAL, INC., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,669

(22) Filed: Jan. 27, 2023

(65) Prior Publication Data
US 2023/0274347 A1     Aug. 31, 2023

Related U.S. Application Data

(63) Continuation of application No. 16/833,002, filed on Mar. 27, 2020, now Pat. No. 11,593,874, which is a (Continued)

(51) Int. Cl.
*G06Q 40/00* (2023.01)
*G06Q 30/0207* (2023.01)
*G06Q 30/0282* (2023.01)

(52) U.S. Cl.
CPC ......... *G06Q 40/00* (2013.01); *G06Q 30/0207* (2013.01); *G06Q 30/0282* (2013.01)

(58) Field of Classification Search
None
See application file for complete search history.

(56) References Cited

U.S. PATENT DOCUMENTS

| 5,956,693 A | 9/1999 | Geerlings |
| 6,515,681 B1 | 2/2003 | Knight |

(Continued)

FOREIGN PATENT DOCUMENTS

| WO | 2008/008037 A1 | 1/2008 |
| WO | 2013/181152 A2 | 12/2013 |

OTHER PUBLICATIONS

A. A. Sallam and S. K. Udgata, "An integrated architecture for Notification System to enhance the efficiency of Mobile Marketplace," 2011 International Conference on Business, Engineering and Industrial Applications, 2011, pp. 198-202, doi: 10.1109/ICBEIA.2011.5994241. (Year: 2011).

(Continued)

*Primary Examiner* — Joseph W. King
*Assistant Examiner* — Liz P Nguyen
(74) *Attorney, Agent, or Firm* — Alston & Bird LLP

(57) ABSTRACT

A merchant system structures communications among merchants, partners, and customers. The merchant system may include a messaging component that organizes messages so that a manager can quickly navigate and understand the content of incoming messages. The messaging system also may categorize a user's profile so that a user may share profile information established at a first merchant with a second merchant.

20 Claims, 23 Drawing Sheets

Related U.S. Application Data continuation of application No. 13/903,678, filed on May 28, 2013, now Pat. No. 10,628,880.

(60) Provisional application No. 61/652,664, filed on May 29, 2012.

(56) References Cited

U.S. PATENT DOCUMENTS

| | | | |
|---|---|---|---|
| 8,019,647 | B1 | 9/2011 | Gidwani et al. |
| 8,156,008 | B2 | 4/2012 | Bae et al. |
| 2004/0006478 | A1 | 1/2004 | Alpdemir et al. |
| 2005/0240465 | A1* | 10/2005 | Kiran .................. G06Q 10/105 705/7.25 |
| 2006/0003826 | A1* | 1/2006 | Walker ................... A63F 13/65 463/9 |
| 2007/0112636 | A1 | 5/2007 | Lucker, Jr. |
| 2007/0130016 | A1 | 6/2007 | Walker et al. |
| 2007/0162337 | A1 | 7/2007 | Hawkins et al. |
| 2007/0179853 | A1 | 8/2007 | Feige et al. |
| 2008/0027820 | A1 | 1/2008 | Brill |
| 2009/0076911 | A1 | 3/2009 | Vo et al. |
| 2009/0076912 | A1 | 3/2009 | Rajan et al. |
| 2009/0106370 | A1 | 4/2009 | Dreyfus et al. |
| 2009/0112722 | A1 | 4/2009 | Williams |
| 2009/0271263 | A1 | 10/2009 | Regmi et al. |
| 2010/0274659 | A1 | 10/2010 | Antonucci et al. |
| 2011/0093318 | A1 | 4/2011 | Guday et al. |
| 2011/0112897 | A1 | 5/2011 | Tietzen et al. |
| 2011/0191173 | A1* | 8/2011 | Blackhurst ............. G06Q 30/02 705/14.49 |
| 2011/0313840 | A1 | 12/2011 | Mason et al. |
| 2012/0047011 | A1 | 2/2012 | Rippetoe et al. |
| 2012/0054001 | A1 | 3/2012 | Zivkovic et al. |
| 2012/0158469 | A1 | 6/2012 | Brewer |
| 2012/0209673 | A1 | 8/2012 | Park |
| 2012/0221402 | A1 | 8/2012 | Brown et al. |
| 2012/0226540 | A1 | 9/2012 | Batalion et al. |

OTHER PUBLICATIONS

An Integrated Architecture for Notification System to enhance the efficiency of mobile marketplace (Year: 2011).

International Preliminary Report on Patentability in Application No. PCT/US2012/026719, dated Sep. 6, 2013, 10 pages.

International Search Report and Written Opinion in Application No. PCT/US2012/026719, dated Jul. 13, 2012, 11 pages.

J. Qaddour, "WAP and Push Technology Integrated into Mobile Commerce Applications," IEEE International Conference on Computer Systems and Applications, 2006., 2006, pp. 779-785, doi: 10.1109/AICCSA.2006.205178. (Year: 2006).

Mobile Coupons. Frequently Asked Questions. Dec. 2010. [retrieved on Jun. 6, 2012]. Retrieved from the Internet <URL: http://Aveb.archive.org/web/20101231012824/http://mobilecoupons.com/MerchantFAQ.aspx> entire document.

Non-final Office Action dated Mar. 13, 2013 from U.S. Appl. No. 13/405,664, 25 pages.

Notification of Transmittal of the International Search Report and the Written Opinion of the International Searching Authority, or the Declaration, issued in International Application No. PCT/US2013/042891 dated Feb. 21, 2014, 11 pages.

Stevens, Loralee; "XYMob launches moble coupons app"; Dec. 13, 2010; North Bay Business Journal; https://www.northbaybusinessjournal.com/article/industry-news/xymob-launches-mobile-coupons-app/ (Year: 2010).

Van Grove, Jennifer; "Groupon Merchants Can Now Create Their Own Deals" Oct. 28, 2010; http://mashable.com/2010/10/28/groupon-stores-merchant-center/ (Year: 2010).

* cited by examiner

FIG. 3 xyz merchant center

Logged in as | accounts | logout view dashboard | redeem vouchers | customer feedback | help customer feedback

Viewing 1-10 of 17 results

Sort by: Date ▼ Rating

| | |
|---|---|
| 01/18/2011 👍 | Had a great time and learned some cool info as well as got some great pictures. Did not realize that the tour was so strenuous, even though the word "active" is in the tour company's name. Would have been helpful if the introductory email sending parking information had highlighted a little more that it's actually a 2.5 mile hike up steep staircases and hilly neighborhoods. It was a lot of fun, but I wasn't as prepared as I could have been. Thanks for a great tour! |
| 01/18/2011 👍 | Great tour! is very informative, friendly, polite. The tour involved climbing several (long) steps/stairs and he was very funny, and my group and I never felt rushed. We took our time. We'd do this again!!! |
| 01/18/2011 👍 | The tour guide was informative and very enjoyable. Took my wife, 12 year old daughter and her friend and we had a great day. We never realized that there was such an awesome adventure right in our own backyard. Will take other friends soon. |
| 01/11/2011 👍 | was extremely knowledgeable and professional, making this tour a truly memorable experience. We will definitely utilize his services | average rating
👍👍👍👍👍
4.5 thumbs up survey results

Will you return to this business?
Yes — 88%
No — 12%

Have you been to this business before?
Yes — 6%
No — 94%

When did you last visit?
Less than 3 months — 100%
3 to 6 months — 0%
More than 6 months — 0% tag cloud
do experience fun great guide hargo hike knowledgeable really strenuous thanks time took tour town

FIG. 4

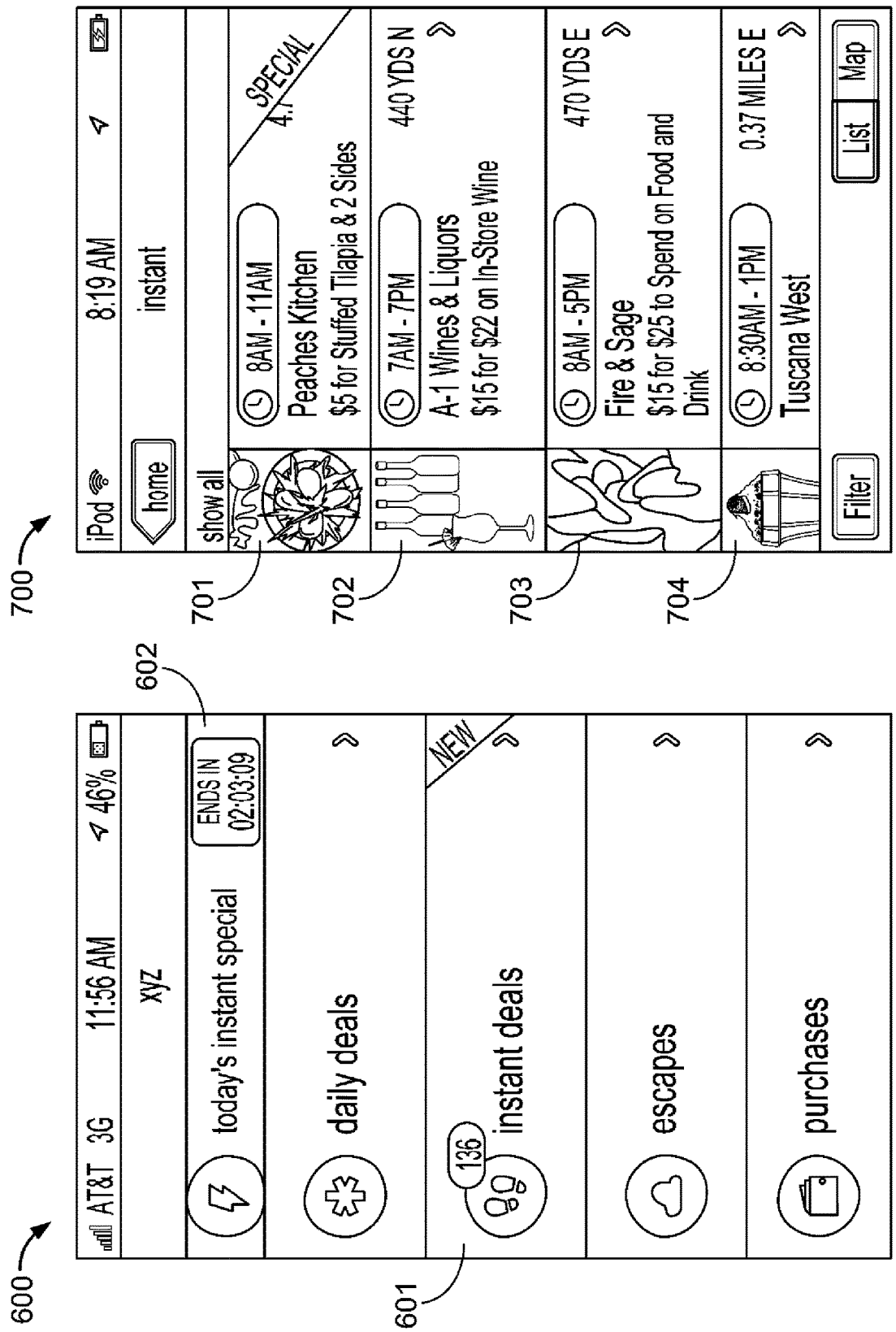

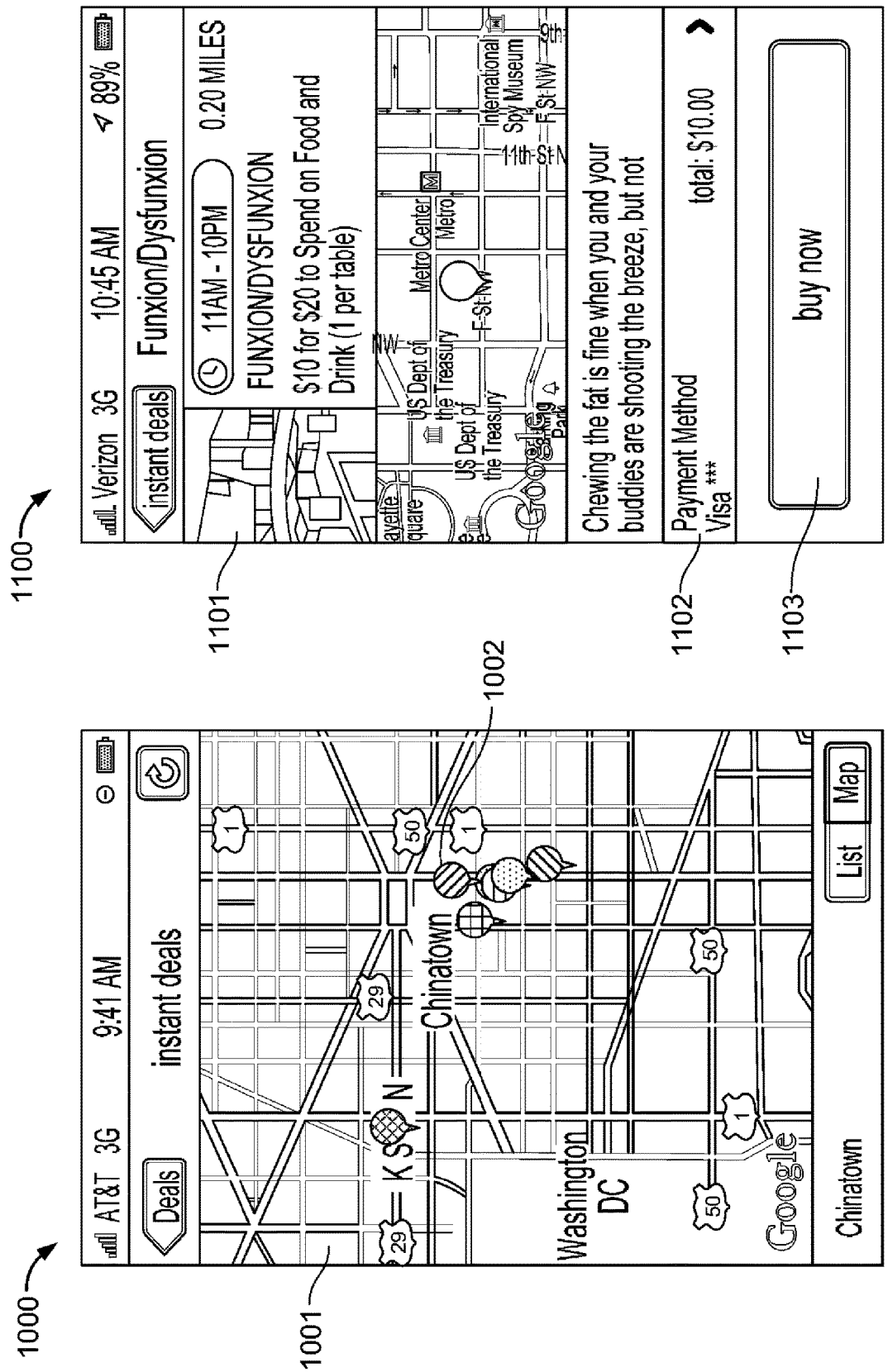

3100

Merchant Message Center

Design a promotion

Who?

5 star customer

Terms?

30% off of first $150

Restrictions

Parties of 4
Not on Saturday night

Projected performance

20% participation from among 1000 5 star customers.
Projected to receive 5 acceptances/night.
Past performance suggests average party under these circumstance will order $250.

My Profile

| User_A |

Share this information?

| Tapas | Yes / No |
| Allergic to shellfish | Yes / No |
| Prefers red wine | Yes / No |
| Interested in family dining/large parties | Yes / No |
| Participates in promotions | Yes / No |

With?

- Everyone
- Restaurant_A
- Do not share

Prompt me before sharing with anyone to confirm that this information can be shared.

Fig. 32

MANAGING MERCHANT COMMUNICATIONS

CROSS-REFERENCE TO RELATED APPLICATIONS

This application is a continuation of U.S. Non-Provisional application Ser. No. 16/833,002, filed on Mar. 27, 2020, entitled "MANAGING MERCHANT COMMUNICATIONS," which is a continuation of U.S. Non-Provisional application Ser. No. 13/903,678, filed on May 28, 2013, entitled "MANAGING MERCHANT COMMUNICATIONS," which claims the benefit of priority to U.S. Provisional Application Ser. No. 61/652,664, filed on May 29, 2012, entitled "MANAGING MERCHANT COMMUNICATIONS," each of which is incorporated herein by reference in its entirety.

TECHNICAL FIELD

The disclosed subject matter relates to a merchant deal creation and redemption system for managing online deals.

BACKGROUND

Computer systems and communication networks, such as the Internet, enable merchants to offer and sell products and services to consumers. Electronic commerce companies facilitate interaction between merchants and consumers by providing websites, web-based applications, and online services to support various processes and transactions involved with the buying and selling of products and services.

BRIEF DESCRIPTION OF THE DRAWINGS

FIG. 3 is a screen shot of a feedback interface provided to the consumer;

FIG. 4 is a screen shot of a merchant portal showing feedback from consumers;

FIGS. 6-15 are screen shots of exemplary user interfaces of a consumer application used for instant deals.

FIGS. 25-31 are screen shots of exemplary user interfaces of a merchant message center used to manage communications.

FIG. 32 is a screen shot of a profile manager that enables a customer to control which profile information is shared among merchants.

DETAILED DESCRIPTION

Figure 1:
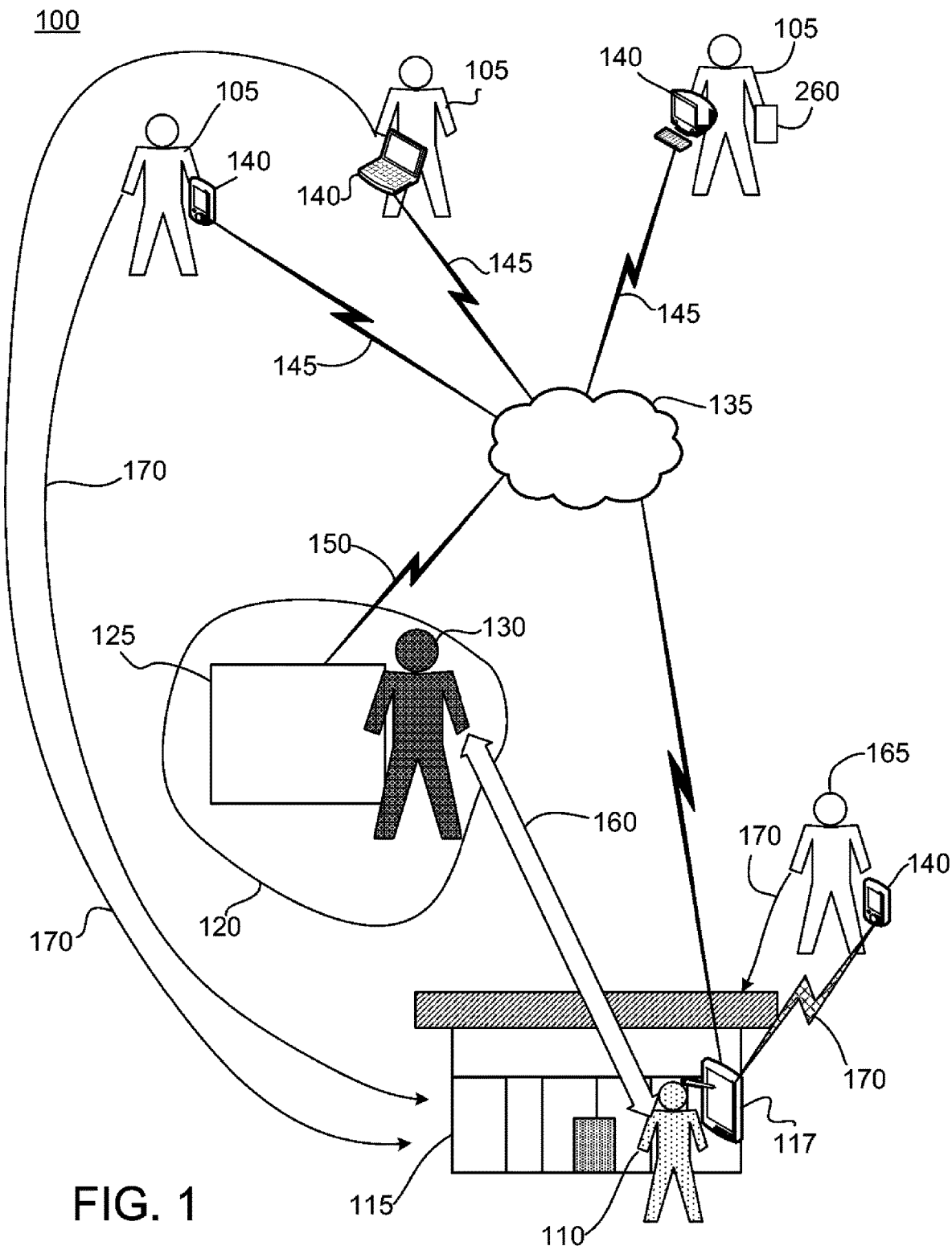
FIG. 1 is a block diagram of an online buying system.

Managing electronic communications with customers and partners may represent a complex undertaking for a merchant. A merchant may feature a small management team primarily focused on operational issues (e.g., delivering services to customers). Thus, the merchant may turn to a transaction intermediary in order to facilitate better management of these communications. A merchant may interface with a transaction intermediary to manage communications with customers and manage marketing campaigns. The transaction intermediary may offer a suite of products to the merchant in order to assist with managing communications and assist with other challenges.

For example, the transaction intermediary may offer a merchant message center that structures communications addressed to the merchant in a particular manner. The transaction intermediary may partner with the merchant to offer incentivized promotions that feature a voucher-based offer-and-redemption system. As customers accept the offers, the customers may include special requests and/or instructions. The customer may request a particular time for the offer or include critical information about food allergies. The transaction intermediary may analyze this preference information received alongside other information and identify actionable information for the merchant. The transaction intermediary then may present the actionable information to the merchant through a merchant message center. The merchant message center may be configured to employ a filter so that the merchant may quickly perceive the most pressing information.

In one configuration, the merchant message center includes a prioritized display that shows key excerpts of all customers set to visit a restaurant in the next hour. Thus, when a customer checks in, a restaurant manager viewing the portal may perceive (1) an indication of whether a particular customer is a frequent guest, (2) a list of food allergies, and/or (3) the past purchases of the past customer. The restaurant manager then may act upon this information by offering preferential treatment, equipping the waiter to offer a personalized menu offering, or also making a special note to recommend items that were well-received in the past.

In addition to organizing messages in a merchant message center by time frame, the merchant message center also may organize messages by other categories and criteria. In one configuration, the manager may organize messages by requested reservation so that a merchant may review proposed times for appointments. In another configuration, the manager may sort messages by customer importance. In still another configuration, the merchant message center may view higher level business analytics that show an indication of the overall projected resource requirement. The projected resource requirements also may be linked to a staffing application so that a manager can ensure that the merchant has a specified level of staffing that is responsive to a projected resource level. Thus, a restaurant may add workers of particular skill sets (e.g., extra chefs or waiters) to be responsive to a particular demand.

Referring to FIG. 1, an online buying system 100 is designed to offer a deal to a consumer 105. The deal is a monetary discount given to an item or items for sale by a merchant 110 at a merchant store 115 and the deal can be open for a set period of time (for example, 24 hours). The deal can be group-based (in which a plurality of consumers buy the deal) or the deal can be individually tailored to specific types of consumers.

The merchant 110 is a business entity that has goods and/or services to sell that are of interest to a consumer 105. The merchant 110 can maintain inventory of goods, and can house at least some of the inventory in a brick and mortar store 115. The merchant 110 has a business relationship 160 with a deal broker 130 of a deal brokerage 120.

The deal brokerage 120 is a party that offers the deal in the deal website. The deal broker 130 is an entity that creates, with the help and feedback of the merchant, the deal, offers the deal in the deal website, and manages the deal using the deal machine 125. The deal brokerage 120 and the deal broker 130 do not maintain inventory of goods or services. Rather, it is the merchant 110 who maintains the inventory, for example, at the merchant store 115 or at a location such as a warehouse that may be distinct from the merchant store 115. The merchant store 115 can be a brick and mortar store physically located near to the consumer 105 or to someone else (such as a recipient 165 of the deal) who will be receiving the deal obtained by the consumer 105. The store 115 can alternatively or additionally include a virtual (that is, online) store accessible through a network.

The deal is offered by the deal brokerage 120 in a deal website that is created and managed by a deal machine 125, which is controlled by or accessible to one or more deal brokers 130. The item or items for sale by the deal brokerage 120 can be a product (for example, food) or a service (for example, cleaning services or transportation services) or groups of products or groups of services. The deal website enables the consumer 105 to purchase the deal and then share the deal with others.

Figure 2:
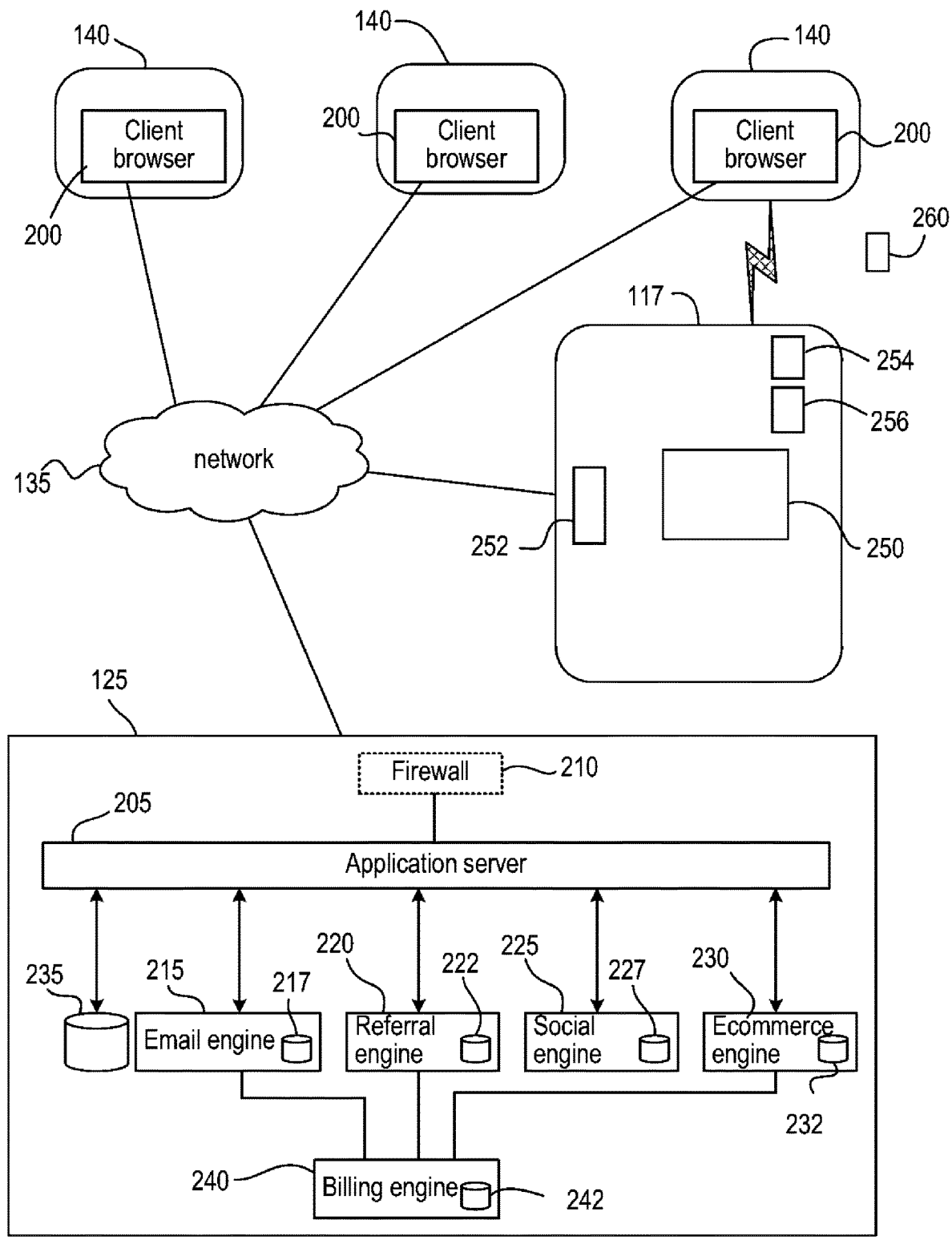
FIG. 2 is a block diagram of hardware components including a deal machine and a merchant tablet of the online buying system of FIG. 1.

The deal machine 125 includes a programmable machine that is able to respond to instructions in a well-defined manner and can execute instructions (such as found in a program or engine). The deal machine 125 includes electronic and digital components, including hardware needed to implement the instructions and read/access data. The deal machine 125 includes a communication mechanism that is able to communicate with the network 135 through a communication channel 150. Additionally, the deal machine 125 includes components such as a web server that hosts and manages the deal website. The deal website can be public (viewable by anyone on the Internet) or private (viewable only by persons who have provided identifiable information and have received a unique identification number). Details of the deal machine 125 are shown in FIG. 2 and are discussed below with reference to FIG. 2.

The consumer 105 communicates with the deal machine 125 through a network 135 such as the Internet. The network 135 may include any combination of local area and/or wide area networks, and the communication channels 145, 150 can be wired, wireless, or a combination of the two.

The consumer 105 is an entity who participates in the online buying of the deal. The consumer 105 can be a human or a computer-controlled device able to participate in online deal buying. The consumer uses the consumer communications device 140 to access the deal at the deal website hosted by the deal machine 125 on the network 135, or through any other suitable interface for receiving the deal.

The consumer's communication device 140 can be a computer such as a desktop computer or laptop computer, a smartphone, a cellular telephone, a personal digital assistant (PDA), or any other device that includes equipment to communicate over a communication channel 145 to access the network 135. The communication device 140 is capable of receiving input and transmitting data through the network 135.

As discussed in greater detail below, the deal website provides an interface through which the consumer 105 can obtain information about the deal, such as, for example, the location at which the deal can be used, the price of deal, a description of the item or items for sale in the deal, or the time during which deal is offered.

Once the deal is purchased, the consumer 105 can retain the deal for his or herself or the consumer 105 can give the deal to another recipient (for example, by gifting the deal). The consumer 105 (or the recipient of the deal if the recipient is not the consumer 105) can use the deal (represented by the arrow 170) by accessing the merchant store 115 either in person (if the store 115 is a brick and mortar store) or virtually (for example, if the store 115 includes an online presence) before the expiration of the deal voucher.

Various types of deal vouchers are contemplated for showing a record of the purchased transaction. For example, the voucher may be in the form of a printable receipt or may be in the form of a receipt viewable through a graphical user interface (GUI) of a portable electronic device (such as a smartphone) on the consumer 105.

To use the deal, the consumer 105 presents a deal voucher to the merchant 110 and enables the merchant 110 to scan or read the deal voucher to check that it is valid (that is, not expired and not fraudulent). For example, the consumer 105 can print the deal voucher and take it to the merchant store 115. As another example, the consumer 105 can let the merchant 110 electronically scan a code that is unique to the deal voucher and is displayed on a portable electronic device (such as a smartphone) of the consumer 105. The consumer 105 (or recipient) can use the deal voucher at any time before the expiration of the deal voucher.

Referring to FIG. 2, the hardware components of the online buying system 100 are shown along with their relationships to each other. In particular, each consumer communication device 140 includes a network browser 200 that provides a user interface on the device 140 to permit access to the network 135. The deal website is displayed or accessible on the network browser 200.

The deal machine 125 includes an application server 205 that is in communication with the network 135 through a firewall 210. The application server 205 includes a combination of hardware and software to provide and manage the deal offers through the network 135. The application server 205 can include memory and input/output devices. The application server 205 is connected to one or more applications or software engines such as an electronic mail (email) engine 215, a referral engine 220, a social engine 225, and an ecommerce engine 230. Additionally, the application server 205 can be connected to a database 235. Each engine 215, 220, 225, 230 can include its own dedicated database 217, 222, 227, 232 that can be accessible to the application server 205. The email engine 215, the referral engine 220, and the ecommerce engine 230 are connected to a billing engine 240, which can also include a dedicated database 242.

The merchant tablet 117 is an Internet-connected tablet-based computer that is able to establish a communication link between the deal machine 125 and the merchant tablet 117, for example, through the network 135. The merchant tablet 117 can be a tablet personal computer or any suitable personal computer such as a desktop computer or laptop computer, a smartphone, a cellular telephone, a personal digital assistant (PDA), or any other device that includes equipment to communicate through network 135. The merchant tablet 117 can be equipped with a touchscreen 250 as a primary input device. The merchant tablet 117 can be controlled by other suitable control mechanism, such as a pressure-triggered stylus, a virtual onscreen keyboard, a physical keyboard, or voice recognition.

In general, the merchant tablet 117 includes the basic components of a portable computer such as a processor, memory, input/output devices (for example, the touchscreen 250, a physical keyboard, buttons, a microphone, a camera, a scanner, a speaker). The merchant tablet 117 includes a wireless adapter 252 for Internet and local network connection. Thus, the merchant tablet can use a Wi-Fi data connection or a wireless (for example, 3G or 4G) data connection to browse the Internet, load and stream media, and install software. The merchant tablet 117 can also include a near-field transceiver device 254 that enables near field communication (NFC) between the merchant tablet 117 and other devices such as the consumer communication device 140.

In some implementations, the merchant tablet 117 may be, for example, an iPad™, while in other implementations, the merchant tablet 117 may be an Android™-based tablet computer. In other implementations, the deal brokerage 120 can design and make a custom-designed merchant tablet 117.

The merchant tablet 117 memory stores an operating system that is run by the processor. In some implementations, the operating system may be customized or custom made. The operating system can allow the deal brokerage 120, through the deal machine 125, to push updates and new applications to the merchant tablets 117 on the demand of either the merchant 110 or the deal brokerage 120. If the merchant tablet 117 is an iPad™, then the operating system may use Apple's iOS operating system. The deal brokerage 120 can develop custom applications on top of the base operating system. Moreover, the operating system may be an Android™-based system.

In some implementations, the deal brokerage 120 leases the merchant tablet 117 to the merchant 110. In other implementations, the deal brokerage 120 sells the merchant tablet 117 to merchant 110. And in still other implementations, the deal brokerage 120 provides the merchant tablet 117 for free to the merchant 110.

The merchant tablet 117 can run various applications. For example, the merchant tablet 117 can run a tablet management system that can be web-based. The tablet management system can track physical devices (such as the merchant tablet 117) from creation, to shipping, to activation by the merchant 110. The tablet management system can provide for remote activation for the merchant 110 with no need for a username and password. The tablet management system can enable the deal brokerage 120 to remotely wipe the merchant tablet 117, for example, remotely erase all of the data that is stored on the merchant tablet 117 and bring the merchant tablet 117 back to its factory default or initial state.

As another example, the merchant tablet 117 can run an application management system that can be web and/or tablet-based. The application management system specifies single or multiple applications to be installed per tablet 117 and/or per merchant 110. The application management system pushes the applications to the merchant tablet 117 for installation. The application management system upgrades and/or manages releases of applications remotely for all applications, including update, delete and remove.

The merchant tablet 117 can be equipped with an app store, where the merchant 110 could access new apps for running her business. The online buying system 100 can be set up to enable third parties to sell apps to merchants 110 through the app store on the merchant tablet 117.

As another example, the merchant tablet 117 can run a deal (voucher) redemption system. The deal redemption system may provide a deal portal for the merchant 110 to log in to and manage his own deals. The deal redemption system may allow the merchant 110 to mark the deal as redeemed. The redemption system can be configured with a device 256 such as a bar code scanner or a credit card reader, which can be used to identify the consumer 105 who is attempting to redeem the deal. For example, the device 256 could be used to scan a special identification card 260 (shown in FIGS. 1 and 2) issued from the deal brokerage 120 to the consumer 105, and the card 260 can have an optical identifier such as a bar code or any other identifier that can be read by the device 256.

The merchant tablet 117 can be equipped with a point of sale (POS) system that is able to accept payment for the deal directly from the consumer communication device 140. In this way, the merchant tablet 117 can enable even greater flexibility for the merchant 110 to run his business.

In some implementations, the merchant tablet 117 can run an analytics system, which enables the merchant 110 to obtain data about the deal, like average check size, how much was made, and where the customer 105 is coming from on a map.

As another example, the merchant tablet 117 can run a customer feedback system, which can be configured to track how much each customer 105 spends when redeeming the deal at the merchant store 115, to track how often each customer 105 visits certain merchants 110, to request feedback from customers 105, and to access or view the customer feedback.

Figure 3:
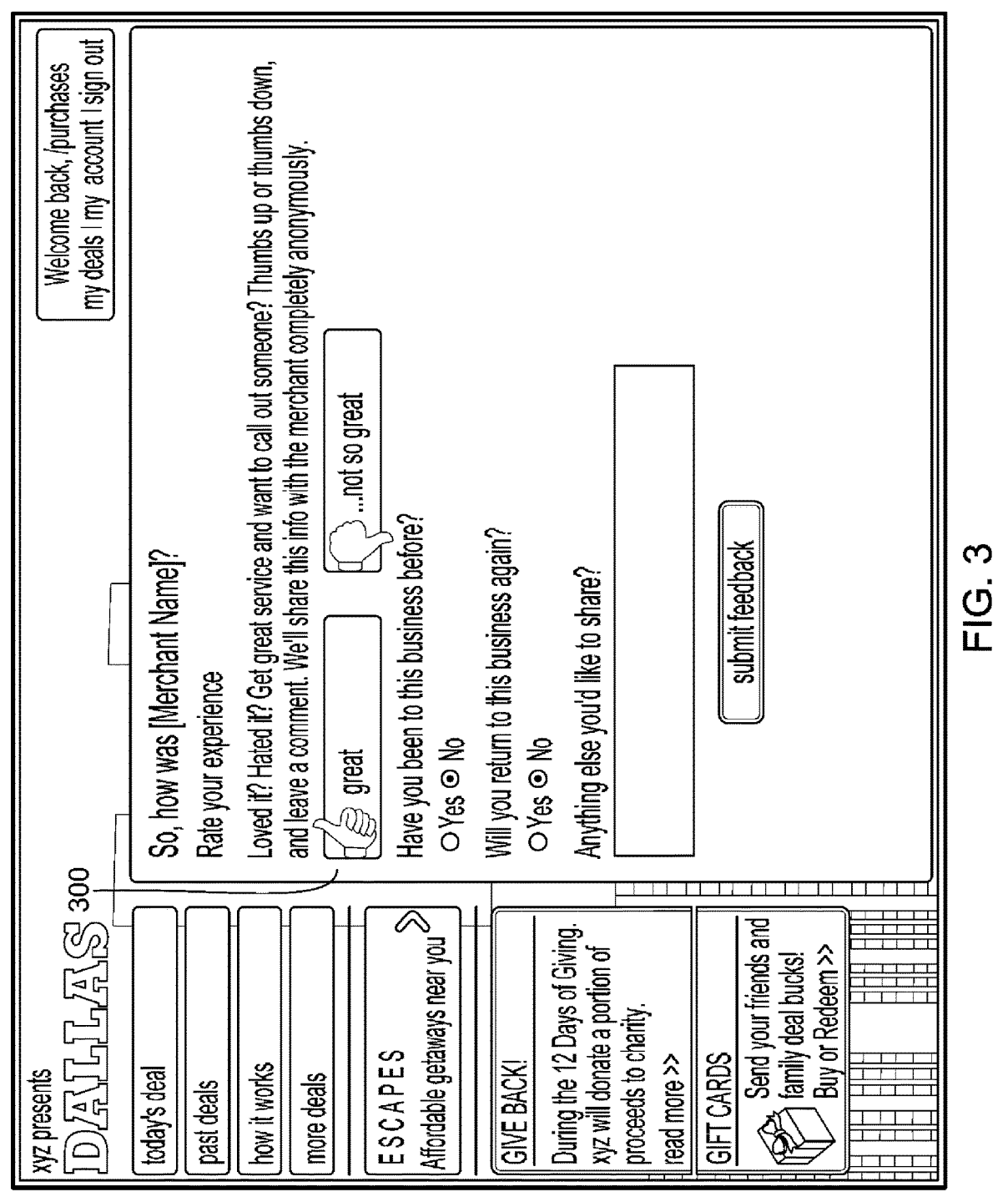

Referring to FIG. 3, for example, a customer 105 can be provided with a feedback interface 300 that is generated by the customer feedback system and/or the deal brokerage 120. The feedback interface 300 asks the customer 105 questions or requests information from the customer 105. In this example, the customer 105 is asked: to rate their experience at the merchant store 115; if she had previously been to the merchant store 115; if she will return to this merchant store 115; and to provide additional comments. The deal brokerage 120 and/or the deal machine 125 can aggregate and analyze the data received by the customers 105.

Referring to FIG. 4, for example, the merchant 110 may be provided with a merchant center feedback interface 400 on the merchant tablet 117 (or on any other suitable computing device operated by the merchant 110). The interface 400 enables the merchant 110 to view the comments, to view aggregated data based on the customer feedback, and can even view a tag cloud to more easily understand the customer feedback. The submissions from the customers 105 can be anonymously provided to the merchants 110.

Another application that can be stored and run on the merchant tablet 117 is a mobile consumer deal voting system. The mobile consumer deal voting system can be used to address issues related to quality of merchant-created deals, consumers can vote on both deals and merchants according to several parameters. For example, in deal-specific voting, consumers 105 can add a positive or a negative vote to any deal they can see on their mobile device, independent of whether the consumer 105 has purchased that deal. These votes can be aggregated (by the deal machine 125 or the merchant tablet 117) and then presented to both the merchant 110 (by way of the merchant tablet 117) and to other consumers 105 to ensure the merchant has feedback on the quality of their offers. The merchant 110 can thereby adjust his offer, as necessary, to keep quality offers coming for consumers 105.

As another example, in merchant-specific voting, consumers 105 can add a positive or a negative vote to any merchant 110 on a per deal basis after purchase and redemption, as well as offer a free text comment about their experience with the merchant 110. These votes can be aggregated (by the deal machine 125 or the merchant tablet 117) and then presented to both merchants 110 (by way of the merchant tablet 117) and other consumers 105 to ensure the consumers 105 have an overall quality guideline for merchants 110 when making a purchasing decision. The aggregate votes and individual comments can also be presented to ensure that all parties involved have an understanding of the quality provided by the merchant 110. In other implementations, the mobile consumer deal voting system can be run on the deal machine 125 or can be presented to the merchant 110 by way of another computer.

Another application that can be stored and run on the merchant tablet 117 is a merchant deal creation system. Using the merchant deal creation system, a merchant 110 can access an interface on the merchant tablet 117. The interface permits the merchant 110 to define parameters of a deal the merchant would like to offer consumers 105 through mobile channels. Upon deal creation, with approval from the deal brokerage 120, the merchant 110 can offer this deal to consumers 105 at the time and at the price point the merchant specifies; including the ability to limit to a number of purchases per time period as specified by the merchant 110. The merchant 110 may set parameters including, for example, price, value, actual offer details including certain items or services for sale, time the offer is valid, and unit number parameters available to purchase. Alternatively or in addition, the interface of the merchant deal creation system can be accessed on the web in addition to or instead of on the merchant tablet 117.

As a further example, the merchant tablet 117 may run an instant deal system, which enables the real-time purchasing and/or billing of deals. In the instant deal system, the consumer 105 purchases a deal on the street, and can instantly go into the merchant's store 115 to redeem the deal because merchant tablet 117 is updated instantaneously with the deal and the information about the consumer 105 who bought the deal. The instant deal system gives the consumer 105 the ability to view deals in his/her neighborhood on his/her own mobile device (for example, smartphone) 140. The consumer 105 can purchase the deal and then immediately go redeem the deal at the merchant store 115. The merchants 110 are able to set their deal to run during certain times each day (for example, weekdays from 2-5 pm), using the instant deal system to fill available capacity.

In other examples, the merchant tablet 117 can run a real-time deal system. The real-time deal system offers deals in real time to consumers 105 through the merchant tablet 117. The merchant tablet 117 stores information (such as purchasing information, demographic information, or geographic information) about the consumer 105, and can enable the merchant 110 to bid on a certain type of customer 105 (for example, customer X spends $125 on visits to spas) and can tailor an offer for a deal on the fly based on the information such as the customer type and prior buying patterns. In order to assist with tailoring an offer for a deal on the fly, some of the customer's information may be converted into a representation of consumer ranking (e.g., letters, numbers font, icon, image, etc.), which indicates the customer's likelihood of accepting the offered deal. The deal machine 125 uses the consumer ranking or otherwise processes the customer's information by pushing messages to the merchant tablet 117 based on which customers are geographically "near" (or in proximity to) the merchant store 115; thus, the merchant 110 can present a specialized deal to bring these nearby customers 105 into the merchant store 115.

The merchant tablet 117 can include other software to help the merchant 110 connect with consumers 105, perform daily business operations, message online, and increase revenue. For example, the merchant tablet 117 can enable email or online marketing and advertising, can provide scheduling systems, can enable monitoring, aggregation, and consulting of social media such as Facebook™, email, Twitter™, etc., can provide consumer loyalty programs, can provide location-based services and networking, and can be used to track and manage inventory.

The online buying system 100, and in particular, the merchant tablet 117 may simplify redemption and small business processes, ensure that merchants 110 know in real-time their options, status, and opportunities with respect to products and services offered by the deal brokerage 120, help consumers 105 and merchants 110 interact with the deal brokerage 120 and with each other, and permit real-time transactions.

Figure 5:
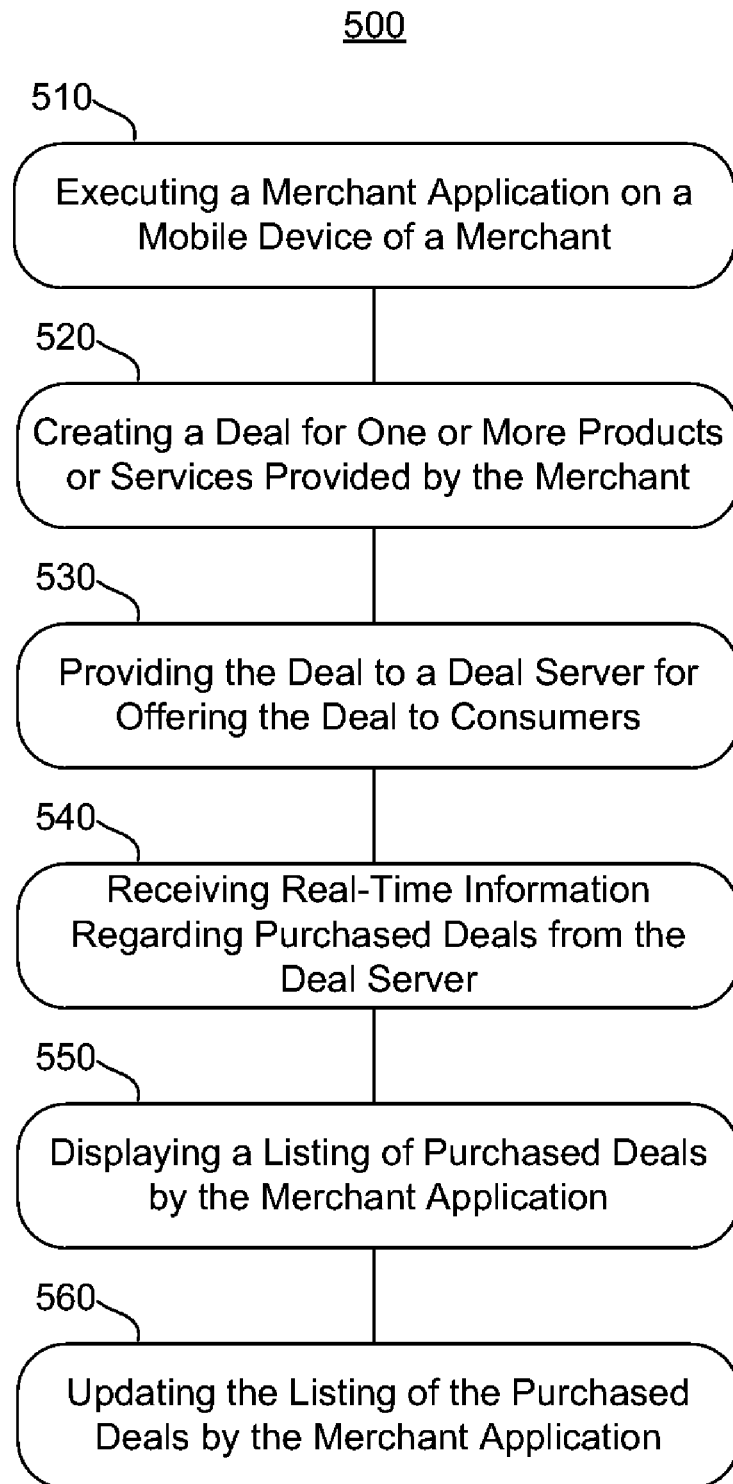
FIG. 5 is a flow chart of a computer-implemented method performed by a mobile device of a merchant.

Referring to FIG. 5, a computer-implemented method 500 includes steps that may be performed by a mobile device (for example, the merchant tablet 117) of a merchant (for example, the merchant 110).

As shown, the computer-implemented method 500 includes executing a merchant application on the mobile device of the merchant 110 (step 510). The merchant application may be provided by the deal brokerage 120. In some cases, the merchant application may be pre-installed on a mobile device provided to the merchant 110 by the deal brokerage 120. In other cases, the merchant application may be downloaded to the mobile device of the merchant 110 from an app store or the deal website of the deal brokerage 120.

The merchant application may be configured to communicate with a deal server over a network (for example, LAN and/or WAN) via a wireless data connection (for example, Wi-Fi, 3G, 4G, etc.). Typically, the deal server (for example, the application server 205) will be included in a remote online buying system provided by the deal brokerage 120. The deal sever may, however, be a local deal server at the merchant store 115 that also may be provided by the deal brokerage 120. In such cases, the local deal server may be configured to provide Wi-Fi access for the merchant 110 and/or customers of the merchant store 115.

The computer-implemented method 500 includes creating a deal for one or more products or services provided by the merchant 110 (step 520). The deal can be created by the merchant application in response to the merchant 110 inputting parameters such as a price for the deal, a value of the deal, a location at which the deal can be used, and an open period for the deal. The open period, in turn, may indicate a day for the deal and a set time period within the day for the deal during which the deal is offered. In some implementations, the deal can be an instant deal created by the merchant application on the same day that the deal is to be offered. The instant deal may be a completely new deal or based on a prior deal. For example, the instant deal could be based on a prior deal which was created by the merchant and was purchased at least a minimum number of times required the deal brokerage 120 to qualify the prior deal for redistribution as an instant deal.

The computer-implemented method 500 includes providing the deal to the deal server for offering the deal to consumers (step 530). The deal may be provided by the merchant application to the deal server over the network, and the deal server may be configured to offer the deal to consumers on the day for the deal. The deal server can offer the deal to consumers based at least in part on geographic proximity of the consumers to the location at which the deal can be used. For example, the deal may be offered to consumers within walking distance (e.g., 0.5 mile radius) of the merchant store 115. The deal server may be configured to determine the geographic proximity of the consumer. The determination may be achieved through accessing data pertaining to the geographic proximity of the consumer. In some cases, the deal may be offered to particular consumers based on their prior buying patterns, such as through the consumer's purchase history or through the consumer's ranking.

The deal may be pushed to computing devices (such as smartphones) of particular consumers (for example, customers close to the merchant store 115 and/or likely to make a purchase from the merchant store 115). Alternatively or additionally, the deal may be offered to a particular consumer in response to a request for instant deals sent to the deal server by an application installed on a computing device of the particular consumer. For example, a particular consumer can issue a request for instant deals to the deal server using a network browser application and/or a consumer application provided by the deal brokerage 120. Based on the geographic location of the particular consumer, the deal server may aggregate and offer instant deals available from multiple merchants in geographic proximity to the particular consumer. In some cases, the network browser application and/or a consumer application may be configured to determine a geographic location of the particular consumer. The network browser application and/or consumer application may display instant deals which are in geographic proximity to a consumer as a listing and/or as icons on a map. The consumer may use the network browser application and/or consumer application to select instant deals and to purchase selected instant deals via transactions with the deal server.

Referring to FIG. 6, a touch-sensitive user interface 600 of a consumer application displays multiple categories of deals including an "instant deals" category 601 that displays a total number of instant deals available. As shown, the user interface 600 also may include a "special deal" banner 602 for a particular instant deal which displays the time remaining for the particular instant deal.

Referring to FIG. 7, a touch-sensitive user interface 700 of the consumer application displays a listing of available instant deals including a "special" instant deal 701 available from 8 AM-11 AM, an instant deal 702 available from 7 AM-7 PM, an instant deal 703 available from 8 AM-5 PM, and an instant deal 704 available from 8:30 AM-1 PM.

Figures 8, 9:
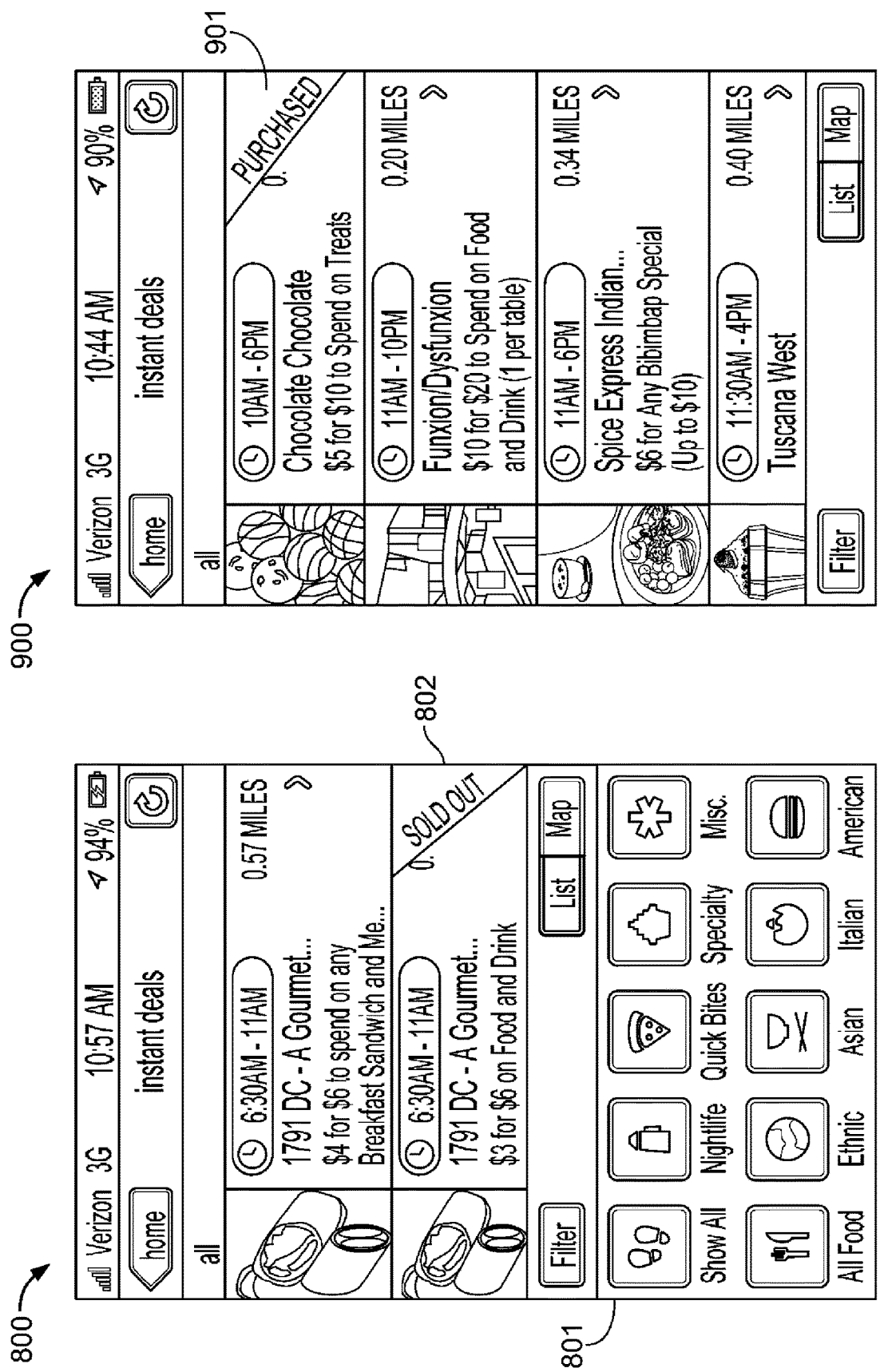

Referring to FIG. 8, a touch-sensitive user interface 800 of the consumer application displays filtering options 801 for filtering instant deals based on various categories of products and/or services. It can be appreciated that the listing of instant deals may be ordered based on distance, time, price, and so forth. As shown, the listing of instant deals may be updated to reflect a "sold out" instant deal 802.

Referring to FIG. 9, a touch-sensitive user interface 900 of the consumer application a displays a listing of instant deals which has been updated to reflect an instant deal 901 purchased by the consumer.

Referring to FIG. 10, a touch-sensitive user interface 1000 of the consumer application displays a map 1001 including icons 1002 corresponding to locations of available instant deals in geographic proximity to the consumer.

Referring to FIG. 11, a touch-sensitive user interface 1100 of the consumer application displays a selected instant deal 1101, a payment method button 1102, and a "buy now" button 1103.

Figure 12:
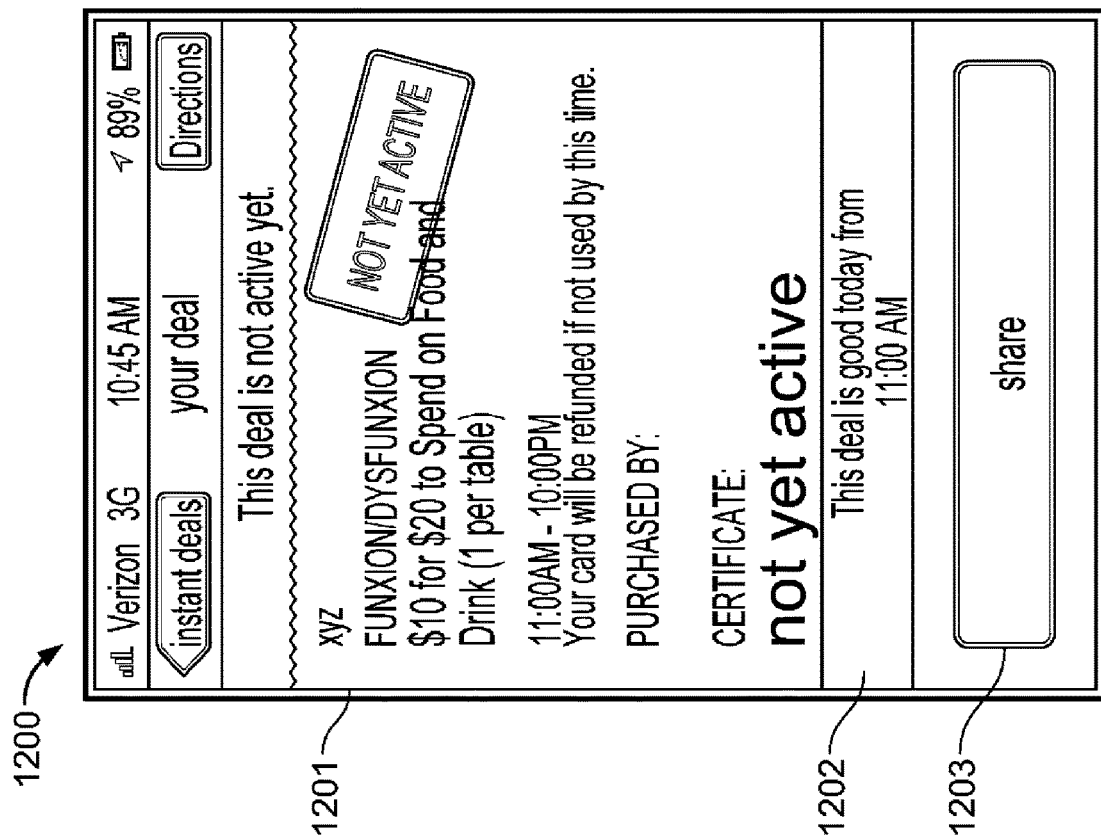

Referring to FIG. 12, a touch-sensitive user interface 1200 of the consumer application displays an indication 1201 that a selected instant deal is not yet active and a message 1202 advising the consumer of the time that the selected instant deal will be active. The user interface also includes a "share" button 1203 for sharing the selected instant deal with others.

It can be appreciated that the selected instant deal may be shared with others before the selected instant deal is active.

Figure 13:
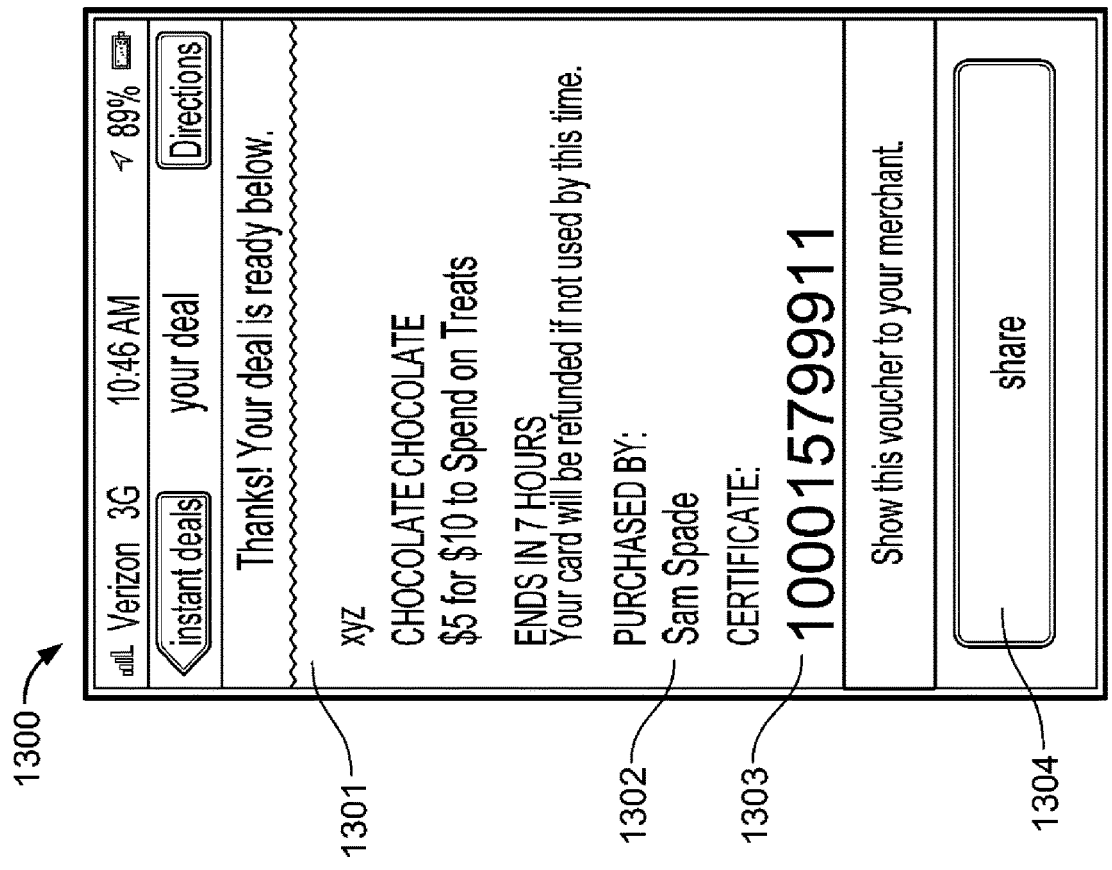

Referring to FIG. 13, a touch-sensitive user interface 1300 of the consumer application displays an indication 1301 that a selected instant deal has been purchased. The indication 1301 displays deal information including a purchaser name 1302 and a unique voucher identifier 1303. The unique voucher identifier may include any number of indicators that shows proof that the user purchased the deal, such as a differentiable sequence of numbers, a differentiable sequence of letters, a differentiable sequence of characters and symbols, a differentiable barcode, a differentiable sequence of images, and/or some combination of the above. The user interface 1300 also includes a "share" button 1304 for sharing the purchased instant deal with others. A purchased deal may be shared with others before and after redemption.

Figures 14, 15:
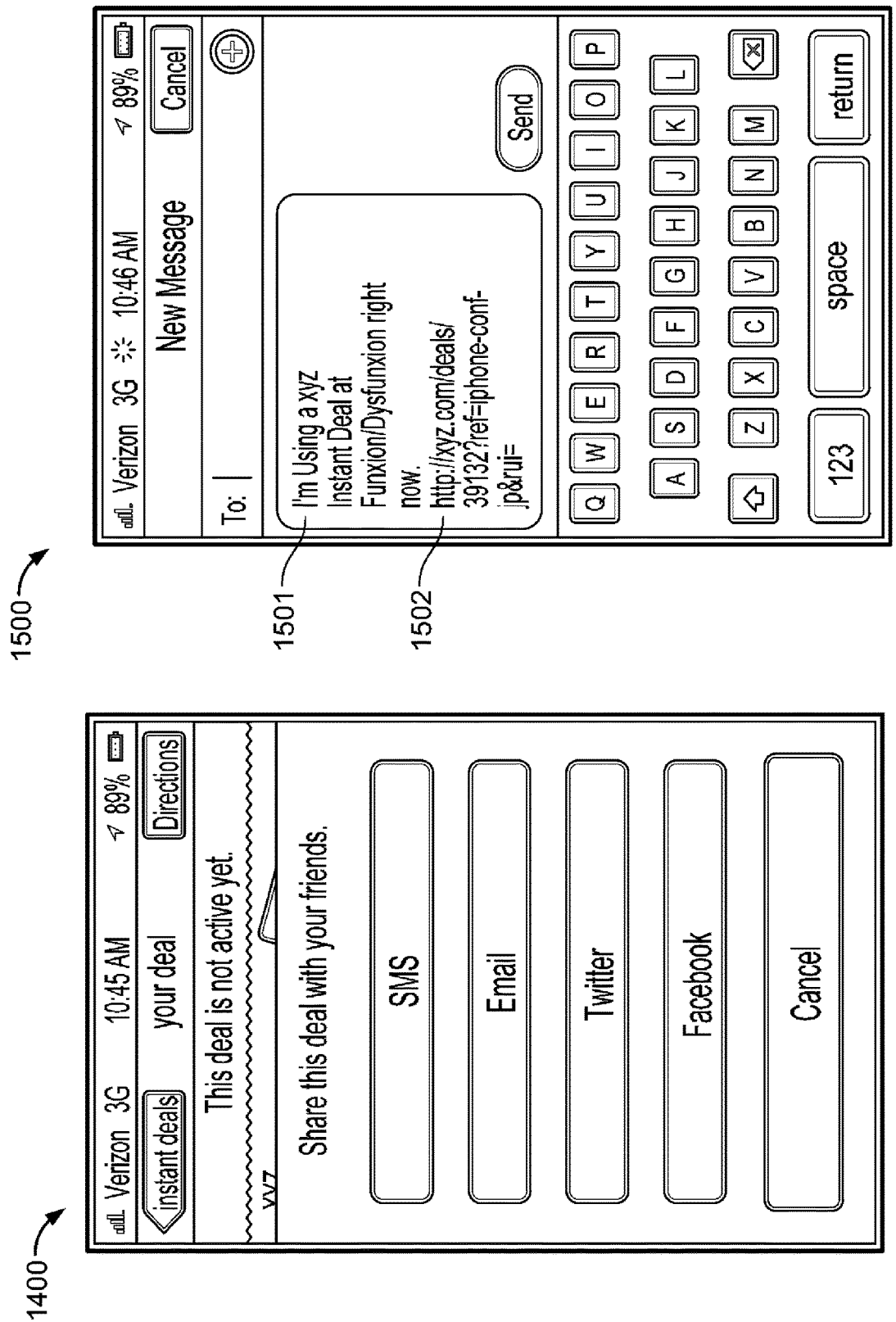

Referring to FIG. 14, a touch-sensitive user interface 1400 of the consumer application displays options for sharing a deal using SMS, email, Twitter™, and Facebook™.

Referring to FIG. 15, a touch-sensitive user interface 1500 of the consumer application displays a messaging interface for enabling the consumer to compose and send a message 1501 for sharing a deal with others. As shown, the body of the message 1501 includes a unique link 1502 for sharing the deal. If the deal is purchased by others using the unique link 1502 at least a minimum number of time (e.g., three times), the deal is free to the consumer.

The computer-implemented method 500 includes receiving real-time information regarding purchased deals from the deal server (step 540). In various implementations, real-time information is received by the merchant application from the deal server over the network in response to transactions made between the deal server and consumers to purchase the deal. For example, when a consumer purchases the deal using the smartphone application or deal website of the deal brokerage 120, real-time information is conveyed from the deal server to the merchant application on the mobile device of the merchant. The real-time information may include deal information including a unique voucher identifier for each purchased deal and the name of the purchaser.

The computer-implemented method 500 includes displaying a listing of purchased deals by the merchant application (step 550). In various implementations, the listing of purchased deals includes the name of the purchaser, the voucher identifier of each purchased deal, and a redemption status of each purchased deal.

Figure 16:
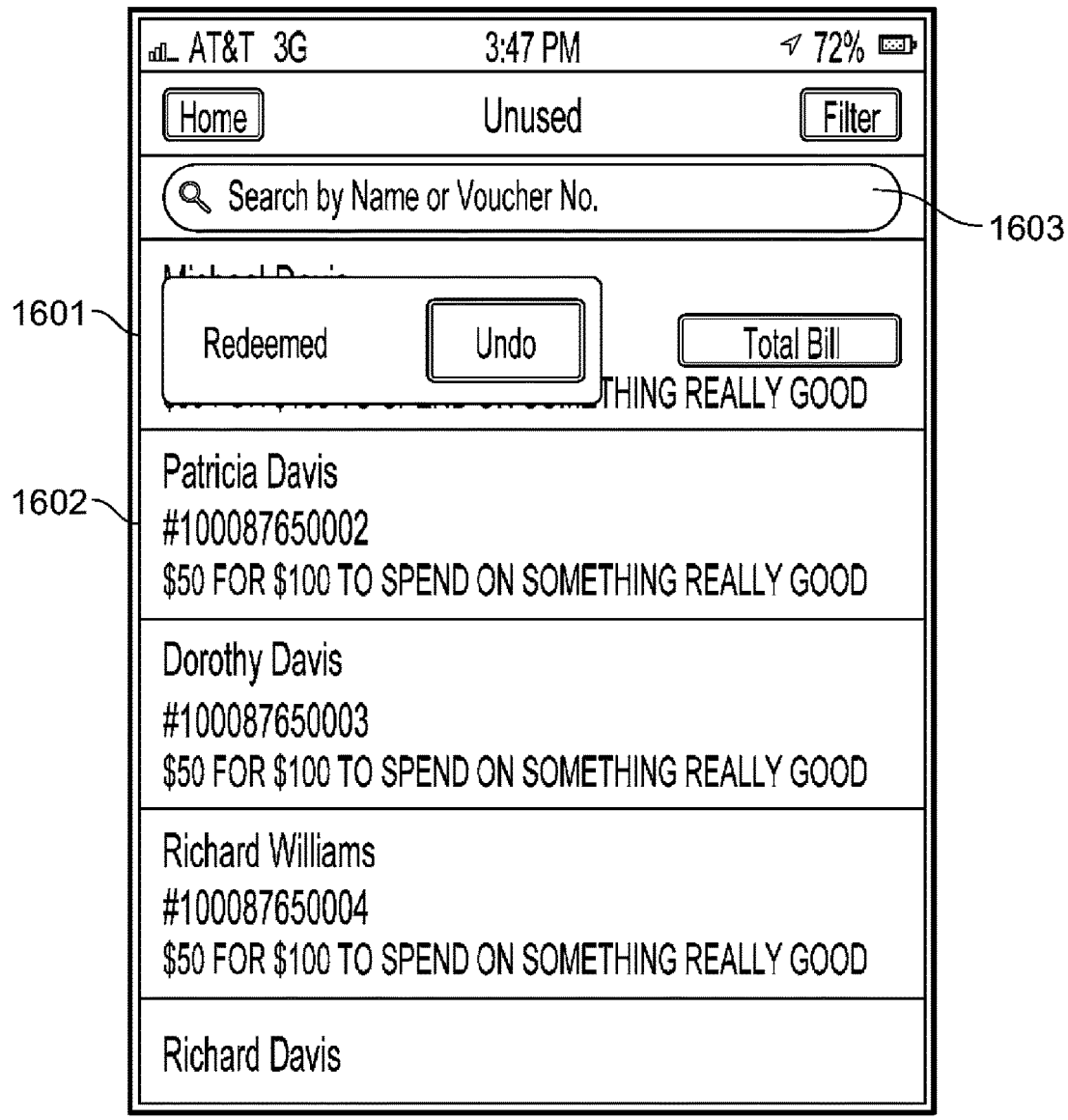
FIGS. 16-24 are screens shots of exemplary user interfaces of a merchant application used for managing and redeeming deals.

Referring to FIG. 16, a touch-sensitive user interface 1600 of a merchant application displays a listing of purchased deals including a redeemed purchased deal 1601 and an unredeemed purchased deal 1602. The user interface 1600 may be displayed by the merchant application on a mobile device (for example, the merchant tablet 117 or a smartphone) and/or other computing device (for example, a personal computer) of the merchant 110. As shown, the merchant may select to undo redemption of the redeemed purchased deal 1601. It can be appreciated that the unredeemed purchased deal 1602 may be selected for redemption by touch input. The user interface 1600 also includes a search interface 1603 to search for deals by name or by voucher identifier.

Figure 17:
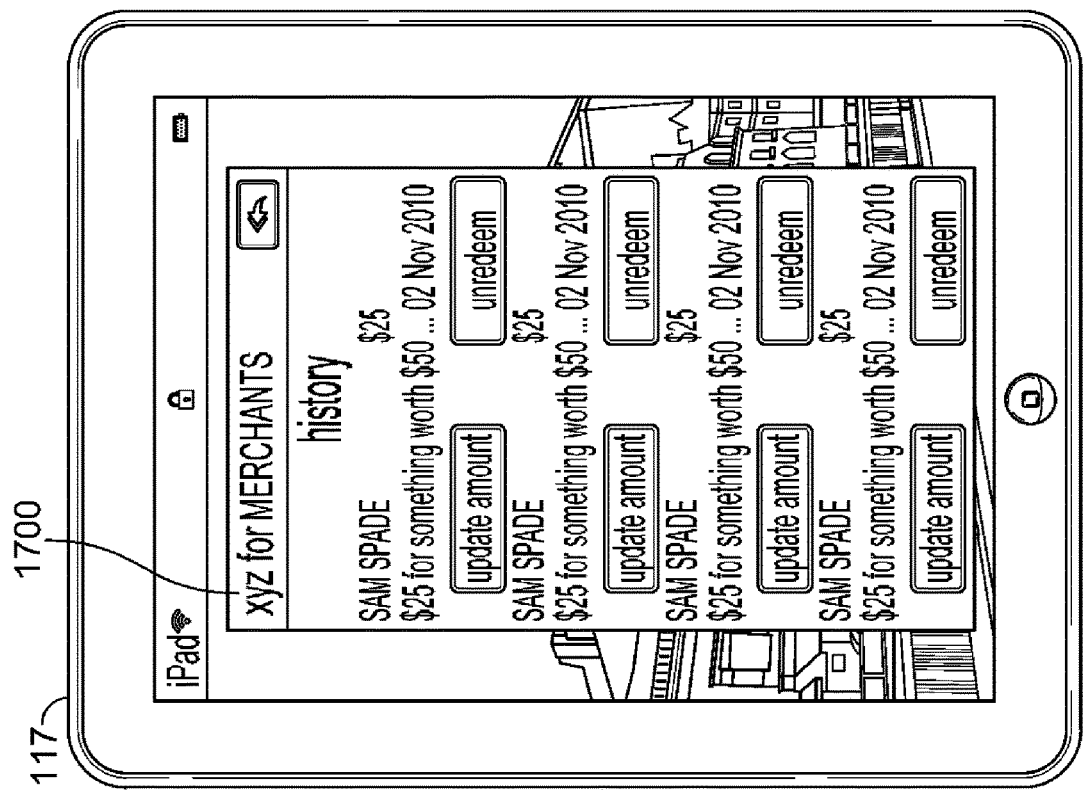

Referring to FIG. 17, a touch-sensitive or other user interface 1700 of a merchant application displays a deal transaction history associated with a particular consumer. The transaction history is configured to be displayed on the user interface of the merchant in accordance with all local laws, customs, practices and regulations that would pertain to the display of a consumer's deal transaction history, and with care to protect user-sensitive information as needed. The user interface 1700 may be presented, for example, upon searching for deals by consumer name and/or searching for consumers in a geographic location. As shown, the user interface 1700 may be displayed by the merchant application on the merchant tablet 117, for example.

Alternatively or in addition, a touch-sensitive or other user interface 1700 of the merchant application may display a consumer ranking of the type earlier described (e.g., letters, numbers font, icon, image, etc.), which provides a merchant with information on the consumer's chances of accepting a deal transaction. The consumer ranking may also provide information to the merchant on the consumer's loyalty and/or likelihood of purchasing goods and services from the merchant. The consumer ranking may incorporate a consumer's deal transaction history with a merchant, and may also incorporate some combination of other consumer information, such as a consumer's demographics, a consumer's deal purchase history with other merchants, a consumer's methods for purchasing a deal and a consumer's geographic location. The consumer ranking may be generated within the tablet, and/or may be downloaded from a server. The ranking may be presented through user interface 1700 upon searching for deals by consumer name and/or by searching for consumers in a geographic location. The user interface 1700 may be displayed by the merchant application on the merchant tablet 117, for example.

Figure 18:
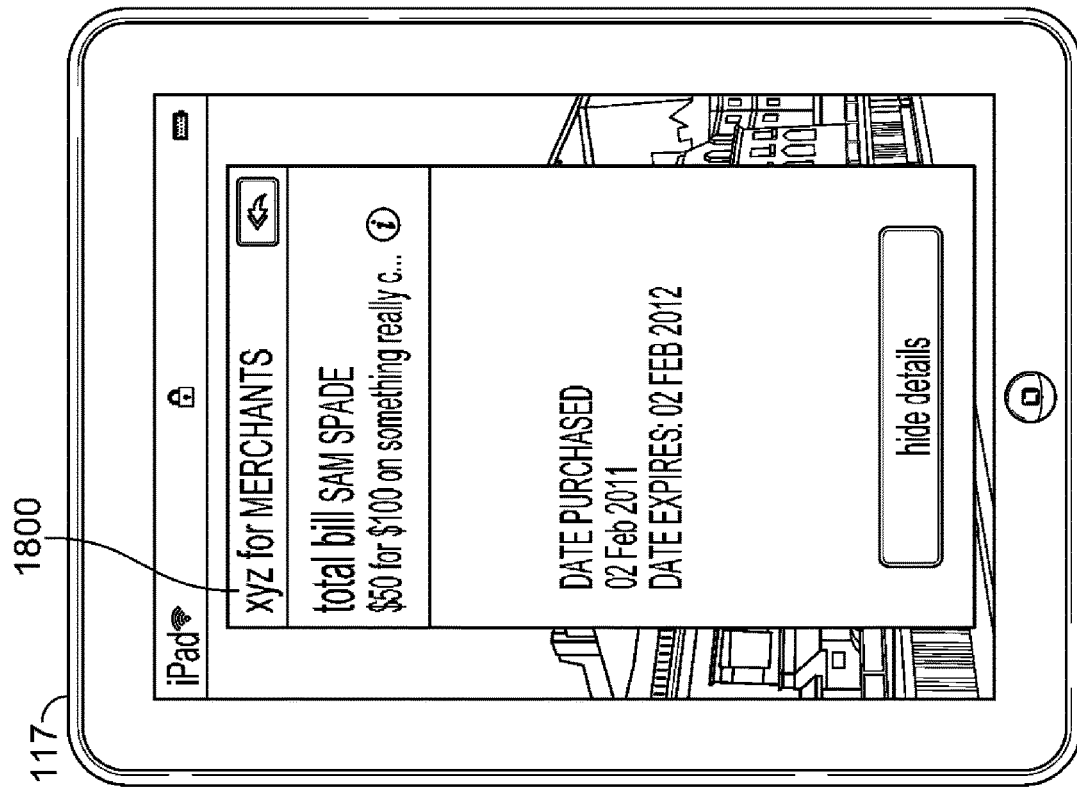

Referring to FIG. 18, a touch-sensitive user interface 1800 of a merchant application displays details for a purchased deal. The user interface 1800 may be presented, for example, upon selecting a particular purchased deal from the user interface 1700 and/or upon searching for a purchased deal by voucher identifier. The user interface 1800 may be displayed by the merchant application on the merchant tablet 117, for example.

The computer-implemented method 500 includes updating the listing of the purchased deals by the merchant application (step 560). The merchant application may update the redemption status of a particular deal in response to receiving input indicating that the particular purchased deal has been redeemed. For example, the merchant application may be configured to update the redemption status of the particular deal in response to receiving touch input corresponding to an entry for the particular deal in the listing of purchased deals. Additionally, the merchant application may be configured to update the redemption status of the particular deal in response to receiving the unique voucher identifier for the particular deal as input. For example, the unique voucher identifier for the particular deal may be received as input when manually entered into a user interface of the merchant application or when optically identified by a scanner (such as a bar code reader or a camera).

Figure 19:
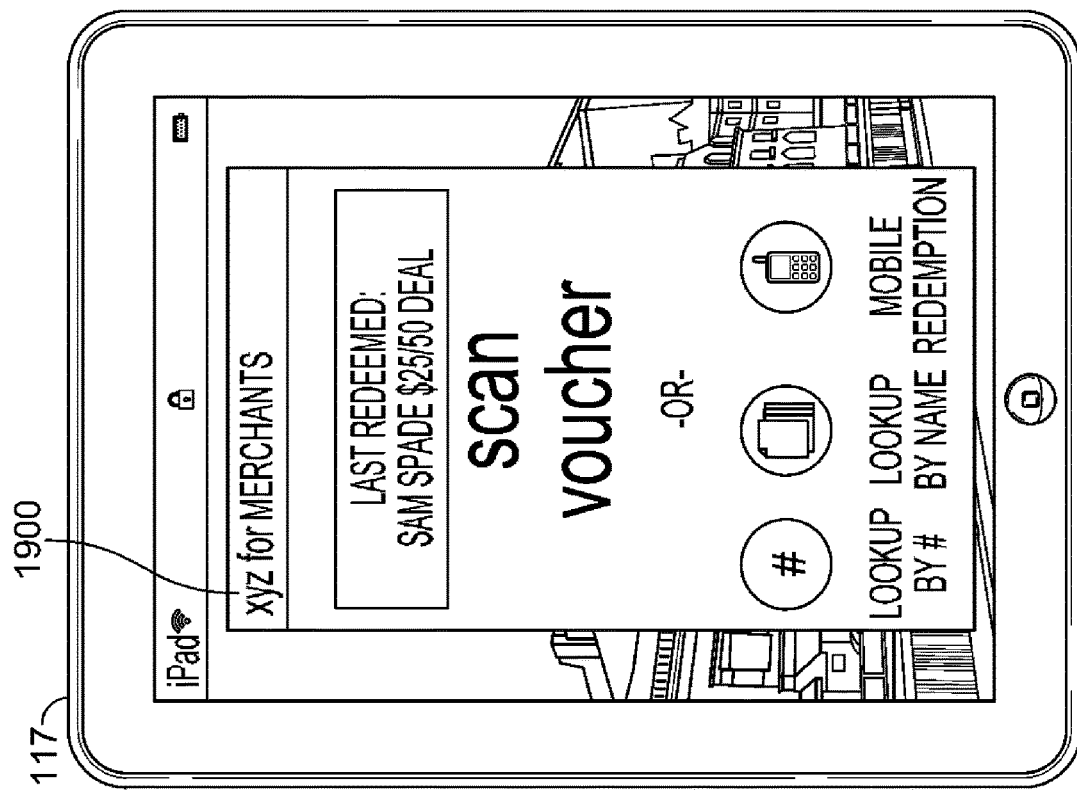

Referring to FIG. 19, a touch-sensitive user interface 1900 of a merchant application displays information regarding the most recent redeemed deal and multiple deal redemption options. As shown, the deal redemption options include redeeming a deal by scanning a voucher, redeeming a deal by voucher identifier lookup, redeeming a deal by name lookup, and redeeming a deal by mobile redemption. The user interface 1900 may be displayed by the merchant application on the merchant tablet 117, for example.

Figure 20:
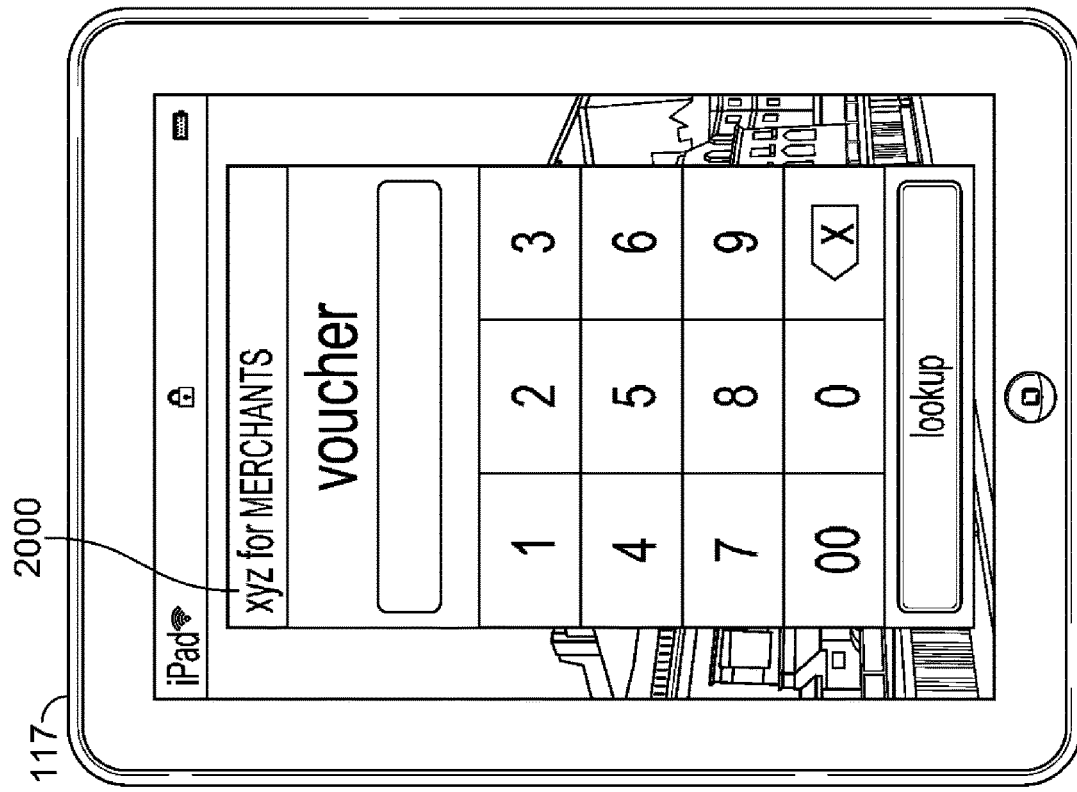

Referring to FIG. 20, a touch-sensitive user interface 2000 of a merchant application displays a voucher identifier lookup screen. The user interface 2000 may be presented, for example, upon selecting to redeem a deal by voucher identifier lookup from the user interface 1900. The user interface 2000 may be displayed by the merchant application on the merchant tablet 117, for example.

Figure 21:
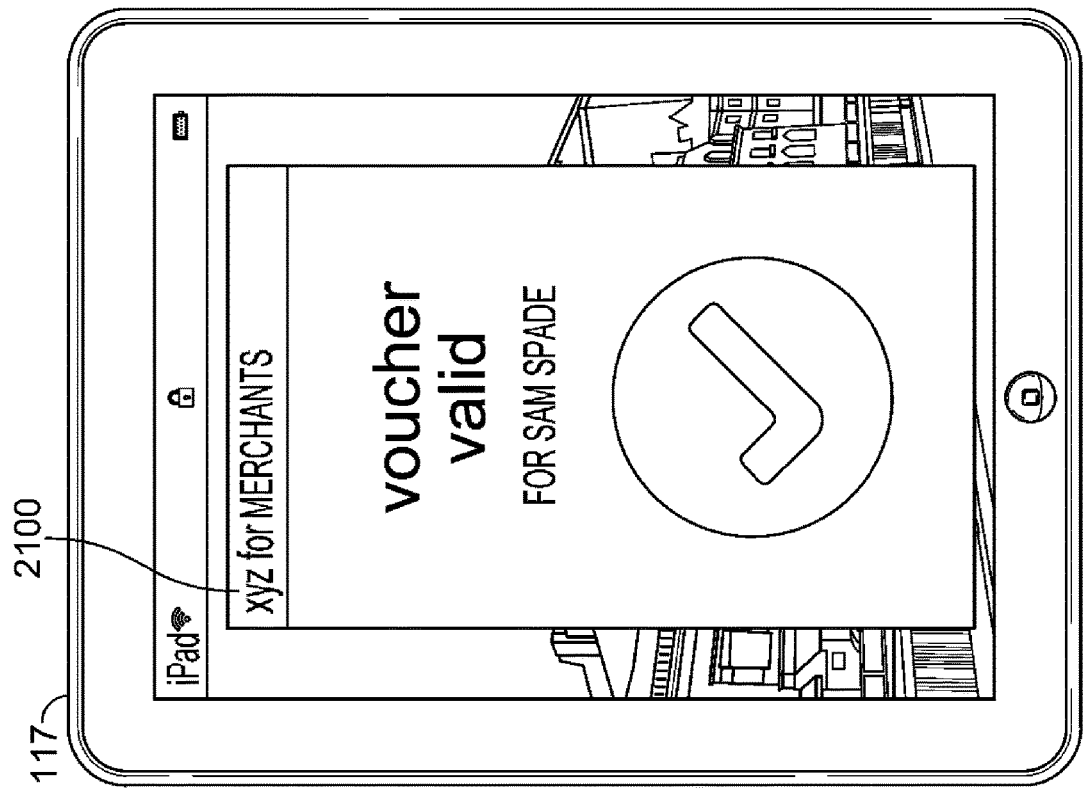

Referring to FIG. 21, a touch-sensitive user interface 2100 of a merchant application displays an indication that a voucher is valid. The user interface 2100 may be presented, for example, upon scanning a valid voucher and/or upon entering a valid voucher identifier into the voucher identifier lookup screen of the user interface 2000. The user interface 2100 may be displayed by the merchant application on the merchant tablet 117, for example. When a valid voucher displayed by the user interface 2100 is selected by touch input, an indication that the valid voucher has been redeemed may be presented and/or the listing of purchased deals in the user interface 1600 may be updated.

Figure 22:
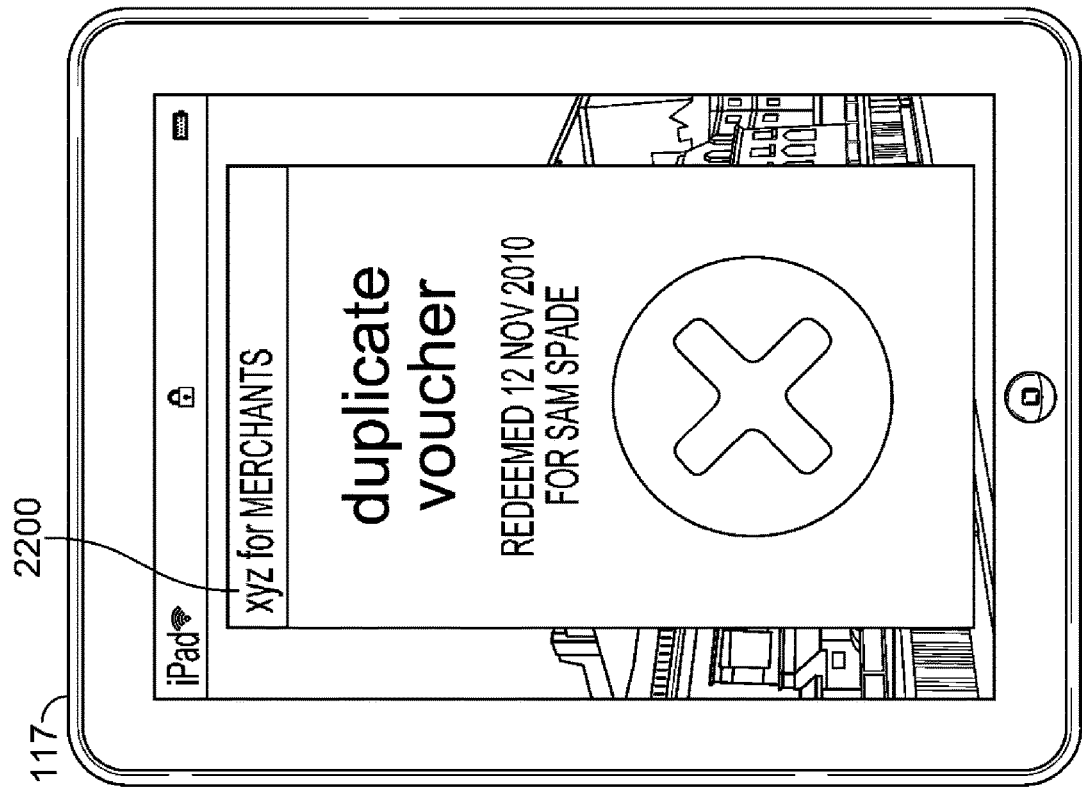

Referring to FIG. 22, a touch-sensitive user interface 2200 of a merchant application displays an indication that a voucher is a duplicate. The user interface 2200 may be presented, for example, upon scanning a redeemed voucher and/or upon entering a redeemed voucher identifier into the voucher identifier lookup screen of the user interface 2000. The user interface 2200 may be displayed by the merchant application on the merchant tablet 117, for example. It can be appreciated that an indication that a voucher is invalid also may be presented upon scanning an invalid voucher and/or upon entering an invalid voucher identifier into the voucher identifier lookup screen of user interface 2000.

Figure 23:
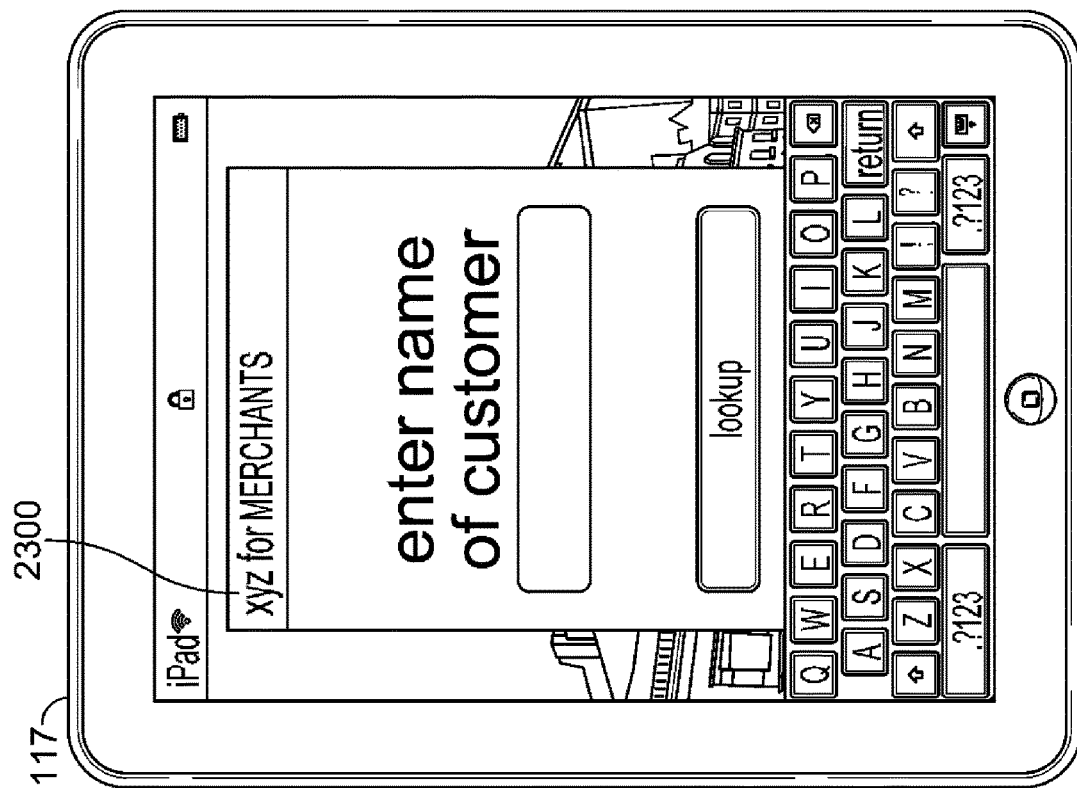

Referring to FIG. 23, a touch-sensitive user interface 2300 of a merchant application displays a name lookup screen. The user interface 2300 may be presented, for example, upon selecting to redeem a deal by name lookup from the user interface 1900. The user interface 2300 may be displayed by the merchant application on the merchant tablet 117, for example.

Figure 24:
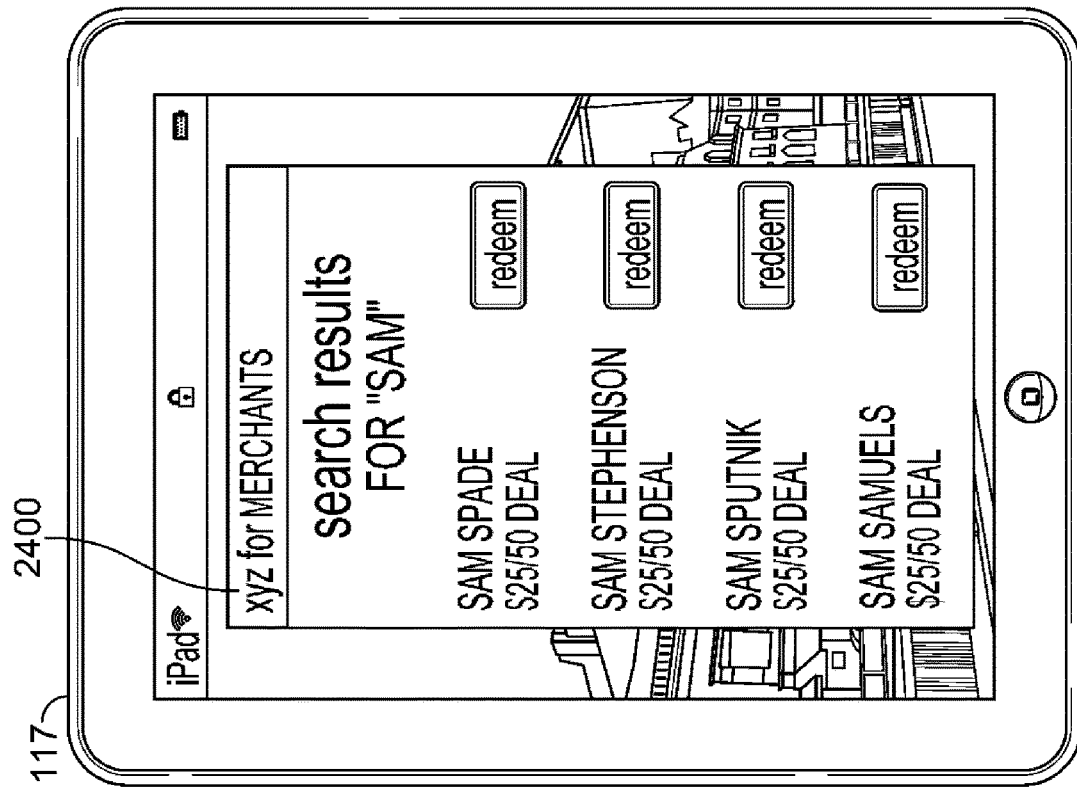

Referring to FIG. 24, a touch-sensitive user interface 2400 of a merchant application displays search results for an entered name. The user interface 2100 may be presented, for example, upon entering text (for example, a partial or full name) into the name lookup screen of the user interface 2300. The user interface 2400 may be displayed by the merchant application on the merchant tablet 117, for example. As shown, the search results include a listing of purchased deals associated with particular purchasers. When touch input is received at the user interface 2400 to redeem a particular purchased deal associated with a particular purchaser, an indication that the deal has been redeemed may be presented and/or the listing of purchased deals in the user interface 1600 may be updated.

Figure 25:
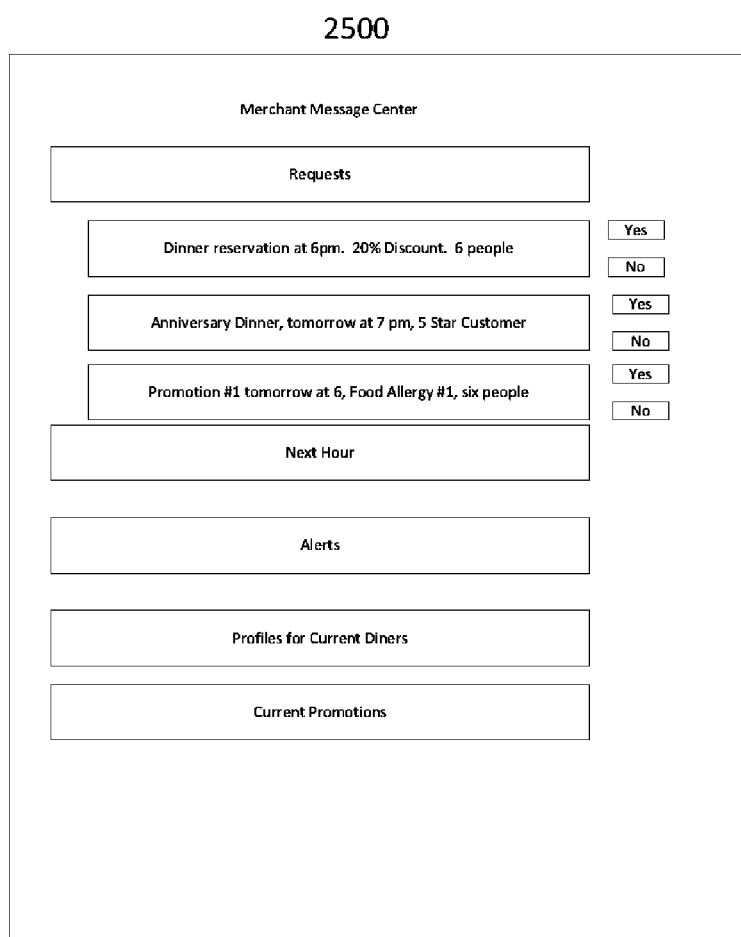

FIGS. 25-31 are screen shots of exemplary user interfaces of a merchant message center used to manage communications. FIG. 25 illustrates a merchant message center that enables a manager at a merchant to perceive timely and prioritized information. As shown, GUI 2500 includes tabs that let a manager perceive requests, "next hour" communications, alerts, profiles for current diners, and promotions. The requests tab allows a manager to perceive the most pressing requests. As shown a merchant can accept a dinner reservation at 6 pm with a 20% discount for 6 people, an anniversary dinner tomorrow at 7 pm for a 5 star customer, and accept a reservation request for a user responding to promotion #1 for six people that has food allergy #1. Note that the manager may select the item to perceive more detailed information, such as, for example, the original text or narrative sent by a prospective customer. The interface shown in GUI 2500 allows the user to readily perceive the most important information that has been identified by the transaction intermediary. In one configuration, the message is sent when the user accepts a promotion (or makes a reservation), and includes comments. The comments then may be analyzed. In another configuration, an electronic mail message sent to the merchant is analyzed and framed in the structured package shown in GUI 2500.

Figure 26:
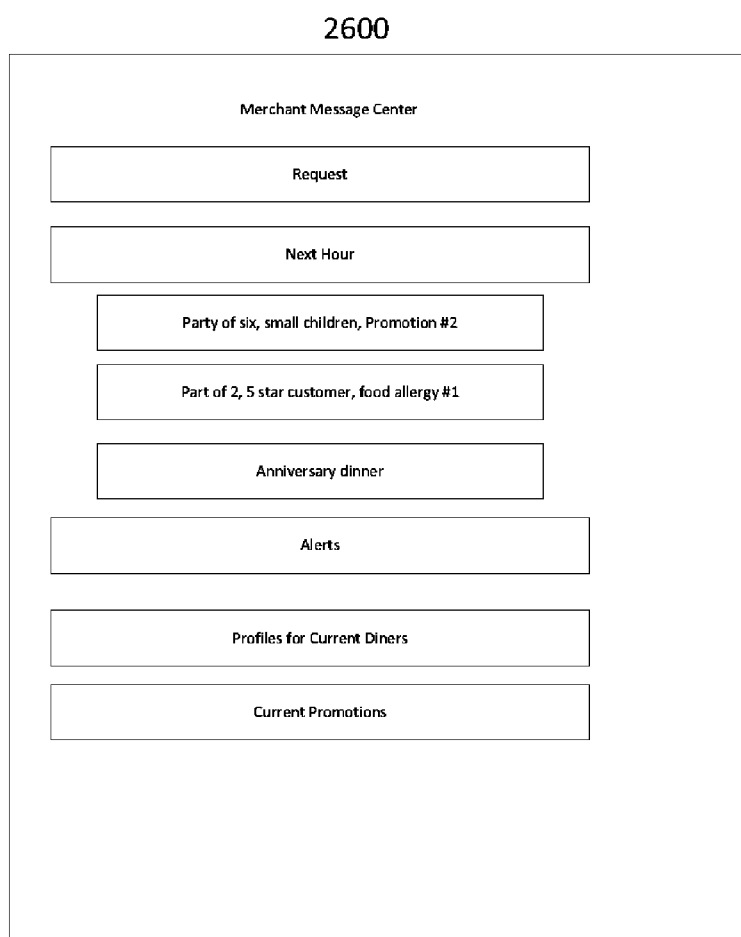

FIG. 26 illustrates an exemplary interface in GUI 2600 that lets a manager perceive prospective customers set to visit a restaurant in the next hour. A manager may select the "next hour" tab in order to better prepare for the next wave of customers and be responsive to the anticipated needs of the customers. Thus, a manager may make a mental note to stop by a five star customer and also to print a custom menu that accounts for a particular food allergy.

Note that the underlying collection of messages may be received in a freeform and lacking structure. The transaction intermediary then may process and order the underlying information in the collection of messages so that the manager may perceive actionable intelligence of the form shown in GUI 2600.

Figure 27:
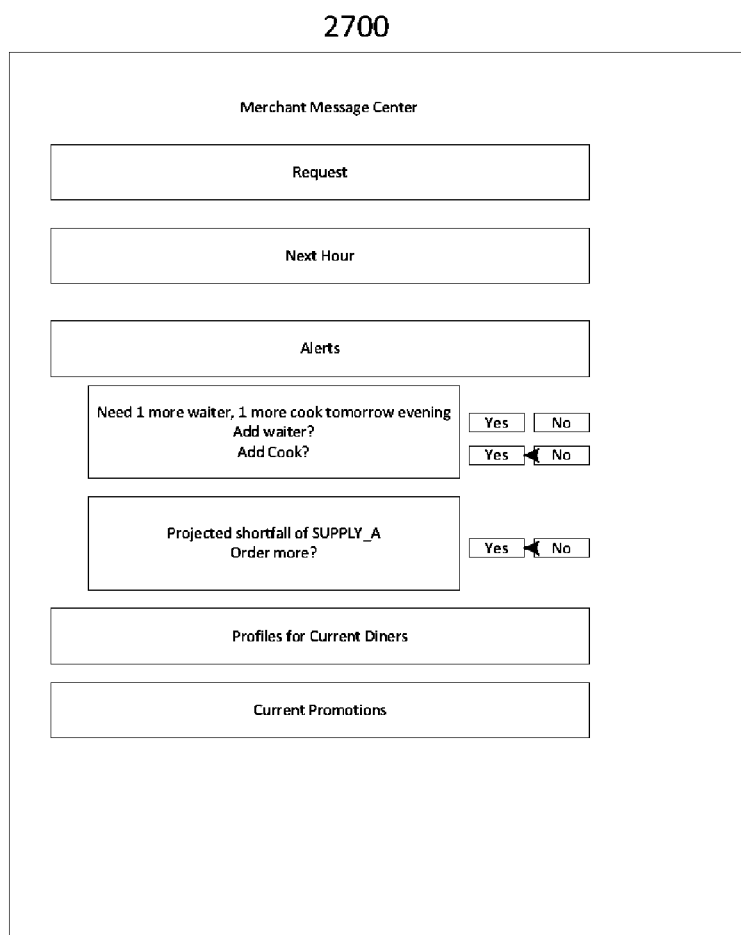

FIG. 27 illustrates an alerts tab in GUI 2700. The alerts tab may be used to project additional staffing and/or resource requirements. In one instance, a promotion may be so popular that the manager needs to schedule and/or hire additional staff in order to work a promotion. In another instance, a manager may need to order additional supplies. The interface shown in GUI 2700 may be linked to a staffing/scheduling application that informs workers of their scheduled shift. GUI 2700 also may be linked to an inventory/pantry management system that automatically places orders for additional goods based on current inventory levels, projected demand, and/or response to current promotions.

Figure 28:
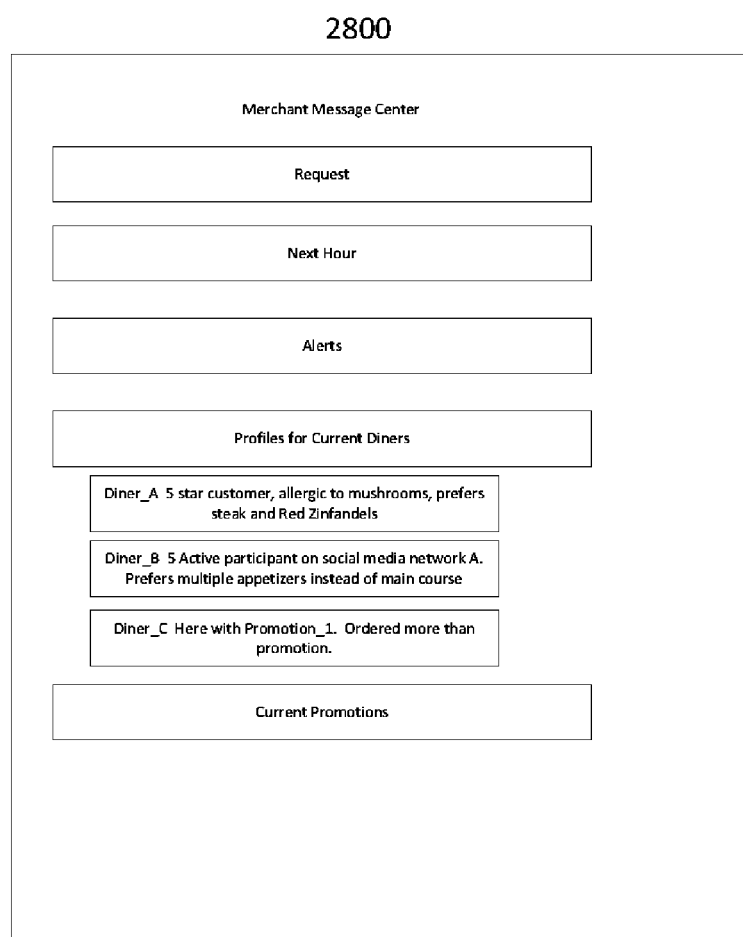

FIG. 28 illustrates an exemplary interface in GUI 2800 that enables a manager to readily perceive their current customer base dining in the restaurant. The manager may perceive which customers represent especially important customers (e.g., 5 star customers), food allergies and preferences, dining styles, and how a customer came to the restaurant. The manager then may act upon this information as the manager visits the patrons on the floor. For example, the manager may attempt to strike up a conversation with Diner_B knowing that Diner_B is likely to comment upon this experience in social media.

Figure 29:
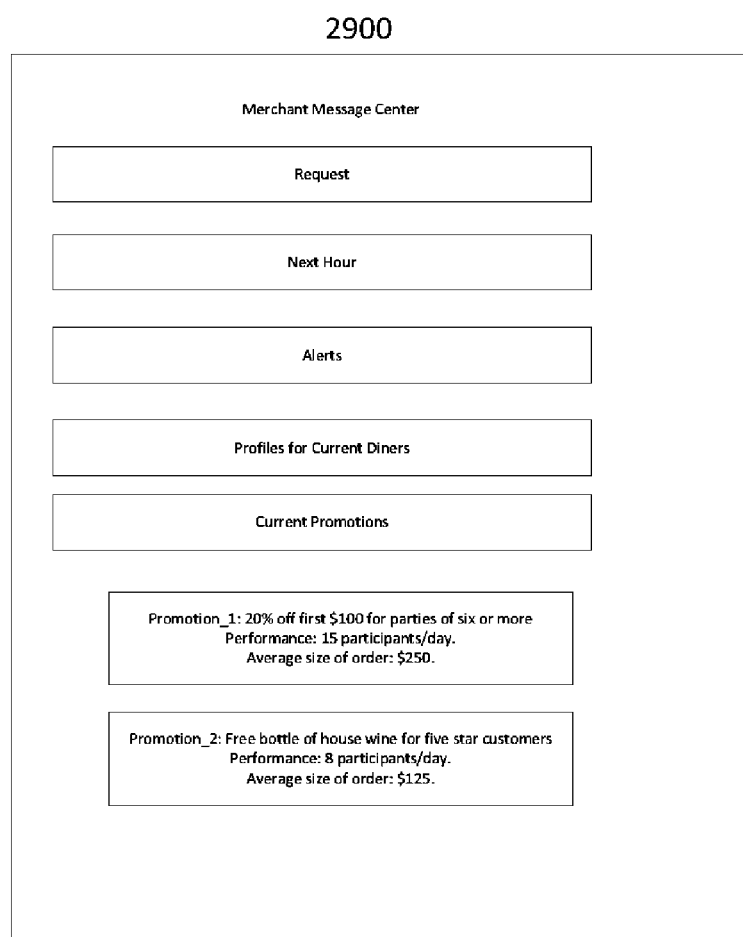

FIG. 29. illustrates a current promotions tab that enables the merchant to perceive the effectiveness of a marketing campaign/promotion. Oftentimes, a merchant may wish to tailor or adjust the terms of the promotion. If a promotion is too popular, the merchant may wish to terminate or expend diminished resources on a promotion so that a merchant is not overwhelmed and/or a desired level of profitability is maintained. Likewise, if a promotion is effective but information about the promotion is not widely disseminated, the merchant may invest additional resources in deal promotion.

Figure 30:
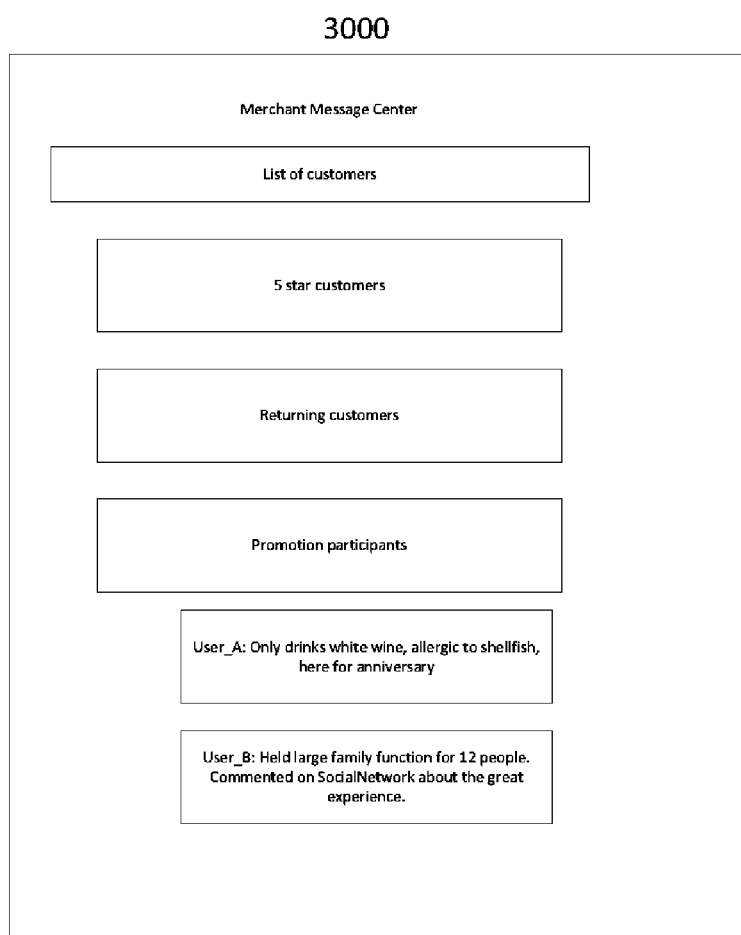

FIG. 30 is an exemplary screen shots of a list of customers that enables a merchant to view their subscriber community. The user may view their subscriber community by value (e.g., the 5 star customers), whether a customer is returning, and/or based on whether a customer was a promotion participant. The list of customers then may be analyzed to design a promotion. For example, a merchant may wish to further understand the list of promotion participants that were not five star customers in order to design a marketing campaign or promotion that increases their participation at the business. The manager then may design a targeted promotion specifically for User_B or those members of the user community that have similar profiles to User_B (e.g., patrons that hold large functions and/or bring in large families)

FIG. 31 is an example a promotion design tool that enables a user to propose a transaction and monitor the impact on profitability. As shown, the manager is targeting 5 star customers with a 30% off the first $150 spent for parties of 4. The user may select one or more of the buttons shown to edit the parameters of the proposed promotion. The projected performance is shown below. As the manager adjusts the promotion, the user may see the impact on the projected financial performance.

FIG. 32 is a screen shot of a profile manager that enables a customer to control which profile information is shared among merchants. For example, a user may rely on the consumer application shown above to participate in an incentivized promotion system. Over time, a rich user profile may be built up. The user may wish to share that information in order to equip a merchant to better offer amenities and also to equip a merchant to be more responsive to the user's needs. The user may wish to share information related to allergies to avoid medical complications and also share information regarding the user's response to past promotions in order to inspire a merchant to design a promotion for the user (or to be included in promotion campaigns that target particular demographics).

As shown, GUI 3200 has privacy controls that are applied so that a User_A can selectively share information by checking "Yes" or "No" after a particular entry. The profile control engine also allows the user to specify whether the information is shared publicly (Everyone), with a particular business (Restaurant), or not shared (Do not share). GUI 3200 also has a privacy control that enables a user to specify whether the user request that the information be shared in every instance.

While the computer-implemented method 500, described above, illustrates a particular sequence of steps, other sequences of steps can be performed in accordance with the described implementations. Moreover, some individual steps of the computer-implemented method 500 can include multiple sub-steps, additional steps can be added to the computer-implemented method 500, and/or some steps can be removed from the computer-implemented method 500 depending on a particular implementation.

In one configuration, the merchant message center also may be used to distill information about the merchant's presence in one or more social media forums. Thus, if a comment is made about the merchant on a review site or a social networking engine (e.g., Facebook), the comments (or indicia of the comments) then may be made about the user may be routed to the merchant message center. The manager then may respond to the message and/or investigate the issues if the comments are less than positive. Similarly, the merchant may design a word-of-mouth promotion by distributing a particular link that may be forwarded. As the message is forwarded and viewed by an ever expanding locus of prospective customers, the merchant message center may provide an indication of the manner in which the promotion is being viewed (e.g., number of views, time of views, number of acceptances). The merchant message center then may equip the manager to tailor and/or suspend a promotion based on real-time feedback.

Similarly, merchant message center also may include a contact list of customers and/or prospective customers with profile information for each user. A merchant may view the profile information and design a marketing campaign according to criteria specified by the user (e.g., most profitable customers, most frequently-visiting customers, most "influential" based on social media referrals (e.g., retweets or sharing of links on a user's personalized web page)).

The transaction intermediary may enable the merchant to analyze a proposed marketing campaign. For example, the transaction intermediary may offer a tool that enables the merchant to observe a projected financial model for a particular offer based on the behavior of their customers. In one projection, the merchant may observe the financial performance of a first promotion that offers the 30% most active customers a 33% discount for parties of six or more people. The first promotion may see participation levels of X % with a projected profit of $Y. The merchant then may adjust the parameters to create a second promotion so that the 50% most active customers receive a 20% discount for parties of four or more. The second promotion then may see participation levels of A % and with a projected outcome of $B.

In various implementations, one or more steps the computer-implemented method 500 can implemented as executable computer program instructions stored on a computer-readable storage medium. The computer-readable storage medium can be implemented as one or more types of computer-readable storage media including volatile or non-volatile memory, removable or non-removable memory, erasable or non-erasable memory, writeable or re-writeable memory, and so forth. The terms "computer-readable storage medium" and "computer-readable storage media" specifically do not consist of propagating signals and other types of transitory computer-readable media.

While certain features of the implementations have been illustrated and described, any modifications, substitutions, changes, and equivalents occurring to those skilled in the art are intended to fall within the true spirit of the implementations.

The invention claimed is:

1. An apparatus comprising at least one processor and at least one memory including computer program code, the at least one memory and the computer program code configured to, with the at least one processor, cause the apparatus to:
   generate, at a transaction intermediary, a merchant message interface comprising:
      an alerts tab that is configured to display, when engaged by a user, first data messages that include data associated with a first resource requirement, each first data message is indicative of one or more actions that are to be taken in a first time period for utilizing the first resource requirement, wherein each first data message comprises a first selectable component configured to enable a merchant to accept at least one of the one or more actions for utilizing the first resource requirement and a second selectable component configured to enable a merchant to deny at least one of the one or more actions for utilizing the first resource requirement;
   output, to a display of a merchant device, the merchant message interface;
   receive from the merchant message interface a selection of the first selectable component of the first data message, the selection of the first selectable component of the first data message comprising an order placement; and
   in response to receiving the selection of the first selectable component of the first data message, transmit, in real-time, an order placement data message to an inventory management system, wherein the order placement data message is configured to automatically cause the inventory management system to initiate at least one of the one or more actions for utilizing the first resource requirement.

2. The apparatus of claim 1, wherein the apparatus is further caused to:
   generate, at the transaction intermediary, an updated merchant message interface comprising:
      an updated alerts tab that is configured to display, when engaged by the user, second data messages that include data associated with a second resource requirement, each second data message is indicative of one or more actions that are to be taken in a second time period for utilizing the second resource requirement, wherein each second data message comprises an updated first selectable component configured to enable a merchant to accept at least one of the one or more actions for utilizing the second resource requirement and an updated second selectable component configured to enable a merchant to deny at least one of the one or more actions for utilizing the second resource requirement;
   output, to the display of the merchant device, the merchant message interface; and
   receive from the merchant message interface a selection of the second selectable component of the second data message, the selection of the second selectable component of the second data message comprising a denial of an order placement.

3. The apparatus of claim 1, wherein the inventory management system is a remote computing device.

4. The apparatus of claim 1, wherein the first resource requirement comprises a supplies condition associated with the merchant.

5. The apparatus of claim 1, wherein the first resource requirement comprises a staffing condition associated with the merchant.

6. The apparatus of claim 1, wherein the at least one of the one or more actions for utilizing the first resource requirement comprises the inventory management system transmitting a staffing message to a staff member associated with the merchant.

7. The apparatus of claim 1, wherein the first resource requirement is based at least in part on a determination that promotion sales associated with the merchant are greater than a promotion sales threshold.

8. A computer-implemented method comprising:
   generating, at a transaction intermediary, a merchant message interface comprising:
      an alerts tab that is configured to display, when engaged by a user, first data messages that include data associated with a first resource requirement, each first data message is indicative of one or more actions that are to be taken in a first time period for utilizing the first resource requirement, wherein each first data message comprises a first selectable component configured to enable a merchant to accept at least one of the one or more actions for utilizing the first resource requirement and a second selectable component configured to enable a merchant to deny at least one of the one or more actions for utilizing the first resource requirement;
   outputting, to a display of a merchant device, the merchant message interface;
   receiving from the merchant message interface a selection of the first selectable component of the first data message, the selection of the first selectable component of the first data message comprising an order placement; and in response to receiving the selection of the first selectable component of the first data message, transmitting, in real-time, an order placement data message to an inventory management system, wherein the order placement data message is configured to automatically cause the inventory management system to initiate at least one of the one or more actions for utilizing the first resource requirement.

9. The computer-implemented method of claim 8, further comprising:

generating, at the transaction intermediary, an updated merchant message interface comprising:

an updated alerts tab that is configured to display, when engaged by the user, second data messages that include data associated with a second resource requirement, each second data message is indicative of one or more actions that are to be taken in a second time period for utilizing the second resource requirement, wherein each second data message comprises an updated first selectable component configured to enable a merchant to accept at least one of the one or more actions for utilizing the second resource requirement and an updated second selectable component configured to enable a merchant to deny at least one of the one or more actions for utilizing the second resource requirement;

outputting, to the display of the merchant device, the merchant message interface; and receive from the merchant message interface a selection of the second selectable component of the second data message, the selection of the second selectable component of the second data message comprising a denial of an order placement.

10. The computer-implemented method of claim 8, wherein the inventory management system is a remote computing device.

11. The computer-implemented method of claim 8, wherein the first resource requirement comprises a supplies condition associated with the merchant.

12. The computer-implemented method of claim 8, wherein the first resource requirement comprises a staffing condition associated with the merchant.

13. The computer-implemented method of claim 8, wherein the at least one of the one or more actions for utilizing the first resource requirement comprises the inventory management system transmitting a staffing message to a staff member associated with the merchant.

14. The computer-implemented method of claim 8, wherein the first resource requirement is based at least in part on a determination that promotion sales associated with the merchant are greater than a promotion sales threshold.

15. At least one non-transitory computer-readable storage medium, the at least one non-transitory computer-readable storage medium having computer-executable program code portions stored therein, the computer-executable program code portions comprising program code instructions configured to:

generate, at a transaction intermediary, a merchant message interface comprising:

an alerts tab that is configured to display, when engaged by a user, first data messages that include data associated with a first resource requirement, each first data message is indicative of one or more actions that are to be taken in a first time period for utilizing the first resource requirement, wherein each first data message comprises a first selectable component configured to enable a merchant to accept at least one of the one or more actions for utilizing the first resource requirement and a second selectable component configured to enable a merchant to deny at least one of the one or more actions for utilizing the first resource requirement;

output, to a display of a merchant device, the merchant message interface;

receive from the merchant message interface a selection of the first selectable component of the first data message, the selection of the first selectable component of the first data message comprising an order placement; and in response to receiving the selection of the first selectable component of the first data message, transmit, in real-time, an order placement data message to an inventory management system, wherein the order placement data message is configured to automatically cause the inventory management system to initiate at least one of the one or more actions for utilizing the first resource requirement.

16. The computer-readable storage medium of claim 15, wherein the computer-executable program code portions further comprise program code instructions configured to:

generate, at the transaction intermediary, an updated merchant message interface comprising:

an updated alerts tab that is configured to display, when engaged by the user, second data messages that include data associated with a second resource requirement, each second data message is indicative of one or more actions that are to be taken in a second time period for utilizing the second resource requirement, wherein each second data message comprises an updated first selectable component configured to enable a merchant to accept at least one of the one or more actions for utilizing the second resource requirement and an updated second selectable component configured to enable a merchant to deny at least one of the one or more actions for utilizing the second resource requirement;

output, to the display of the merchant device, the merchant message interface; and receive from the merchant message interface a selection of the second selectable component of the second data message, the selection of the second selectable component of the second data message comprising a denial of an order placement.

17. The computer-readable storage medium of claim 15, wherein the first resource requirement comprises a supplies condition associated with the merchant.

18. The computer-readable storage medium of claim 15, wherein the first resource requirement comprises a staffing condition associated with the merchant.

19. The computer-readable storage medium of claim 15, wherein the at least one of the one or more actions for utilizing the first resource requirement comprises the inventory management system transmitting a staffing message to a staff member associated with the merchant.

20. The computer-readable storage medium of claim 15, wherein the first resource requirement is based at least in part on a determination that promotion sales associated with the merchant are greater than a promotion sales threshold.

* * * * *